United States Patent
Terashita et al.

(10) Patent No.: US 12,137,194 B2
(45) Date of Patent: *Nov. 5, 2024

(54) COMMUNICATION APPARATUS

(71) Applicant: BROTHER KOGYO KABUSHIKI KAISHA, Aichi (JP)

(72) Inventors: Kunihito Terashita, Nagoya (JP); Naoki Yoshida, Nagoya (JP); Tatsuhiko Sone, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,919

(22) Filed: Jun. 6, 2023

(65) Prior Publication Data

US 2023/0319214 A1 Oct. 5, 2023

Related U.S. Application Data

(63) Continuation of application No. 17/482,989, filed on Sep. 23, 2021, now Pat. No. 11,711,481, which is a (Continued)

(30) Foreign Application Priority Data

Mar. 27, 2015 (JP) .................. 2015-066067

(51) Int. Cl.
*H04N 1/32* (2006.01)
*H04N 1/327* (2006.01)
(Continued)

(52) U.S. Cl.
CPC ....... *H04N 1/32518* (2013.01); *H04N 1/3278* (2013.01); *H04N 1/32786* (2013.01);
(Continued)

(58) Field of Classification Search
CPC ....................................... H04W 4/80
See application file for complete search history.

(56) References Cited

U.S. PATENT DOCUMENTS 7,451,222 B2 11/2008 Sullivan
9,860,417 B2 1/2018 Terashita et al.
(Continued)

FOREIGN PATENT DOCUMENTS

JP 2009-171409 A 7/2009
JP 2010-206512 A 9/2010
(Continued)

OTHER PUBLICATIONS

Notice of Reasons for Refusal dated Nov. 14, 2023 received in Japanese Patent Application No. JP 2022-161799.
(Continued)

*Primary Examiner* — Wen W Huang
(74) *Attorney, Agent, or Firm* — Scully, Scott, Murphy & Presser, P.C.

(57) ABSTRACT

A first communication apparatus may repeat a broadcast transmission of a trigger signal via a second interface, which is a signal to be used by a second communication apparatus as a trigger for sending a wireless connection request to the first communication apparatus. The wireless connection request may be for forming a first wireless network to which both the first communication apparatus and the second communication apparatus belong. The first wireless network may be a network for performing a wireless communication via a first interface. The first communication apparatus may receive the wireless connection request via the first interface from the second communication apparatus which has received the trigger signal, and establish a first wireless connection via the first interface with the second communication apparatus so as to form the first wireless network.

8 Claims, 11 Drawing Sheets

Related U.S. Application Data continuation of application No. 16/674,270, filed on Nov. 5, 2019, now Pat. No. 11,159,696, which is a continuation of application No. 16/249,071, filed on Jan. 16, 2019, now Pat. No. 10,506,129, which is a continuation of application No. 15/854,889, filed on Dec. 27, 2017, now Pat. No. 10,205,847, which is a continuation of application No. 15/635,959, filed on Jun. 28, 2017, now Pat. No. 9,860,417, which is a continuation of application No. 15/079,264, filed on Mar. 24, 2016, now Pat. No. 9,712,955.

(51) Int. Cl.
*H04W 4/80* (2018.01)
*H04W 76/14* (2018.01)
*H04W 84/12* (2009.01)

(52) U.S. Cl.
CPC ............ *H04W 4/80* (2018.02); *H04W 76/14* (2018.02); *H04N 2201/0031* (2013.01); *H04N 2201/0039* (2013.01); *H04N 2201/0043* (2013.01); *H04N 2201/0082* (2013.01); *H04N 2201/3205* (2013.01); *H04W 84/12* (2013.01)

(56) References Cited

U.S. PATENT DOCUMENTS

| | | | |
|---|---|---|---|
| 10,383,061 | B2 | 8/2019 | Sekine |
| 10,506,129 | B2 | 12/2019 | Terashita et al. |
| 11,159,696 | B2 | 10/2021 | Terashita et al. |
| 11,711,481 | B2 * | 7/2023 | Terashita ............ H04N 1/3278 358/1.15 |
| 2005/0169219 | A1 | 8/2005 | Serpa et al. |
| 2010/0225962 | A1 | 9/2010 | Okigami et al. |
| 2011/0044308 | A1 | 2/2011 | Kawamura |
| 2011/0066850 | A1 | 3/2011 | Ekberg |
| 2011/0153818 | A1 | 6/2011 | Vandwalle et al. |
| 2012/0264372 | A1 | 10/2012 | Chen et al. |
| 2012/0264382 | A1 | 10/2012 | Lockerbie |
| 2013/0034023 | A1 | 2/2013 | Jung |
| 2013/0148161 | A1 | 6/2013 | Park et al. |
| 2013/0178163 | A1 | 7/2013 | Wang |
| 2013/0201525 | A1 | 8/2013 | Niwa |
| 2013/0227324 | A1 | 8/2013 | Saito et al. |
| 2013/0260682 | A1 | 10/2013 | Suzuki et al. |
| 2013/0260683 | A1 | 10/2013 | Suzuki et al. |
| 2013/0260818 | A1 | 10/2013 | Suzuki et al. |
| 2013/0260819 | A1 | 10/2013 | Suzuki et al. |
| 2013/0308160 | A1 | 11/2013 | Okigami et al. |
| 2013/0314738 | A1 | 11/2013 | Okigami et al. |
| 2013/0314747 | A1 | 11/2013 | Okigami et al. |
| 2013/0314748 | A1 | 11/2013 | Okigami et al. |
| 2013/0321852 | A1 | 12/2013 | Okigami et al. |
| 2014/0063537 | A1 | 3/2014 | Nishikawa et al. |
| 2014/0073244 | A1 | 3/2014 | Ko et al. |
| 2014/0080469 | A1 | 3/2014 | Ko et al. |
| 2014/0094117 | A1 * | 4/2014 | Rajendran ............ H04W 12/35 455/41.1 |
| 2014/0118769 | A1 | 5/2014 | Adachi et al. |
| 2014/0127994 | A1 | 5/2014 | Nightingale et al. |
| 2014/0240776 | A1 | 8/2014 | Suzuki et al. |
| 2014/0256256 | A1 | 9/2014 | Park et al. |
| 2014/0323048 | A1 | 10/2014 | Kang |
| 2014/0323060 | A1 | 10/2014 | Shimazaki |
| 2014/0340711 | A1 | 11/2014 | Okigami et al. |
| 2014/0373123 | A1 | 12/2014 | Kang |
| 2014/0378058 | A1 | 12/2014 | Decuir et al. |
| 2015/0016305 | A1 | 1/2015 | Douer et al. |
| 2015/0023334 | A1 * | 1/2015 | Suga ............... H04W 48/16 370/338 |
| 2015/0049358 | A1 | 2/2015 | Okigami et al. |
| 2015/0062648 | A1 | 3/2015 | Okigami et al. |
| 2015/0077798 | A1 | 3/2015 | Ren |
| 2015/0248266 | A1 | 9/2015 | Suzuki et al. |
| 2015/0289077 | A1 | 10/2015 | Ko et al. |
| 2015/0319674 | A1 | 11/2015 | Hughes et al. |
| 2015/0351143 | A1 | 12/2015 | Seymour et al. |
| 2016/0080914 | A1 | 3/2016 | Yamashita et al. |
| 2016/0162239 | A1 | 6/2016 | Suzuki et al. |
| 2016/0255213 | A1 | 9/2016 | Okazawa et al. |
| 2016/0278006 | A1 | 9/2016 | Lee et al. |
| 2016/0302026 | A1 * | 10/2016 | Lee ............... H04W 8/005 |
| 2016/0316511 | A1 | 10/2016 | Suzuki et al. |
| 2016/0328196 | A1 | 11/2016 | Okigami et al. |
| 2018/0004469 | A1 | 1/2018 | Okigami et al. |
| 2019/0215908 | A1 | 7/2019 | Suzuki et al. |

FOREIGN PATENT DOCUMENTS

| | | | |
|---|---|---|---|
| JP | 2013081248 | A | 5/2013 |
| JP | 2013162381 | A | 8/2013 |
| JP | 2013214801 | A | 10/2013 |
| JP | 2013214802 | A | 10/2013 |
| JP | 2013214803 | A | 10/2013 |
| JP | 2013214804 | A | 10/2013 |
| JP | 2013-236316 | A | 11/2013 |
| JP | 2014-053007 | A | 3/2014 |
| JP | 2014-090238 | A | 5/2014 |
| JP | 2014-168215 | A | 9/2014 |
| JP | 2015023539 | A | 2/2015 |
| JP | 2015033084 | A | 2/2015 |
| JP | 2015-050587 | A | 3/2015 |
| JP | 2015056681 | A | 3/2015 |
| JP | 2015056865 | A | 3/2015 |
| JP | 2015-154206 | A | 8/2015 |
| WO | 2014208154 | A1 | 12/2014 |
| WO | 2015/122129 | A1 | 8/2015 |

OTHER PUBLICATIONS

Notice of Reasons for Refusal dated Aug. 16, 2023 received in Japanese Patent Application No. JP 2022-161799.
"Wi-Fi Peer-to-Peer (P2P) Technical Specification", Wi-Fi Alliance Technical Committee P2P Task Group, Oct. 4, 2010, 159 pages, Version 1.1.
Notice of Allowance dated Mar. 14, 2017 received from the United States Patent Office in related application U.S. Appl. No. 15/079,264.
Office Action dated Nov. 16, 2016 received from the United States Patent Office in related application U.S. Appl. No. 15/079,264.
Notice of Allowance dated Aug. 25, 2017 received from the United States Patent Office in related application U.S. Appl. No. 15/635,959.
Notice of Allowance dated Oct. 1, 2018 received from the United States Patent Office in related application U.S. Appl. No. 15/854,889.
Official Action dated Jun. 5, 2018 received from the Japanese Patent Office in related application JP 2015-066067.
Office Action dated Mar. 14, 2018 received from the United States Patent Office in related application U.S. Appl. No. 15/854,889.
Official Action dated Jul. 23, 2019 received from the Japanese Patent Office in related application JP 2018-175881.
Mizuhara, B., Bluetooth Low Energy o hajimeyou (Let's begin Bluetooth Low Energy), O'Reilly Japan, Inc., Feb. 25, 2015, First Edition, pp. 21-26.
Notice of Allowance dated Aug. 5, 2019 received from the United States Patent Office in related application U.S. Appl. No. 16/249,071.
Office Action dated Mar. 19, 2019 received from the United States Patent Office in related application U.S. Appl. No. 16/249,071.
Notification of Reason for Rejection dated Dec. 22, 2020 received in Japanese Patent Application No. JP 2019-235261.
Office Action dated Mar. 30, 2020 received from the United States Patent Office in related application U.S. Appl. No. 16/674,270.
Notice of Allowance dated Jun. 23, 2021 received from the United States Patent Office in related application U.S. Appl. No. 16/674,270.
Office Action dated Feb. 8, 2021 received from the United States Patent Office in related application U.S. Appl. No. 16/674,270.
Office Action dated Jul. 29, 2020 received from the United States Patent Office in related application U.S. Appl. No. 16/674,270.
Notice of Reasons for Refusal dated Jun. 21, 2022 received in Japanese Patent Application No. JP 2021-119421.

(56) References Cited

OTHER PUBLICATIONS

Office Action dated Oct. 4, 2022 received from the United States Patent Office in related application U.S. Appl. No. 17/482,989.
Notice of Allowance dated Mar. 6, 2023 received from the United States Patent Office in related application U.S. Appl. No. 17/482,989.

* cited by examiner

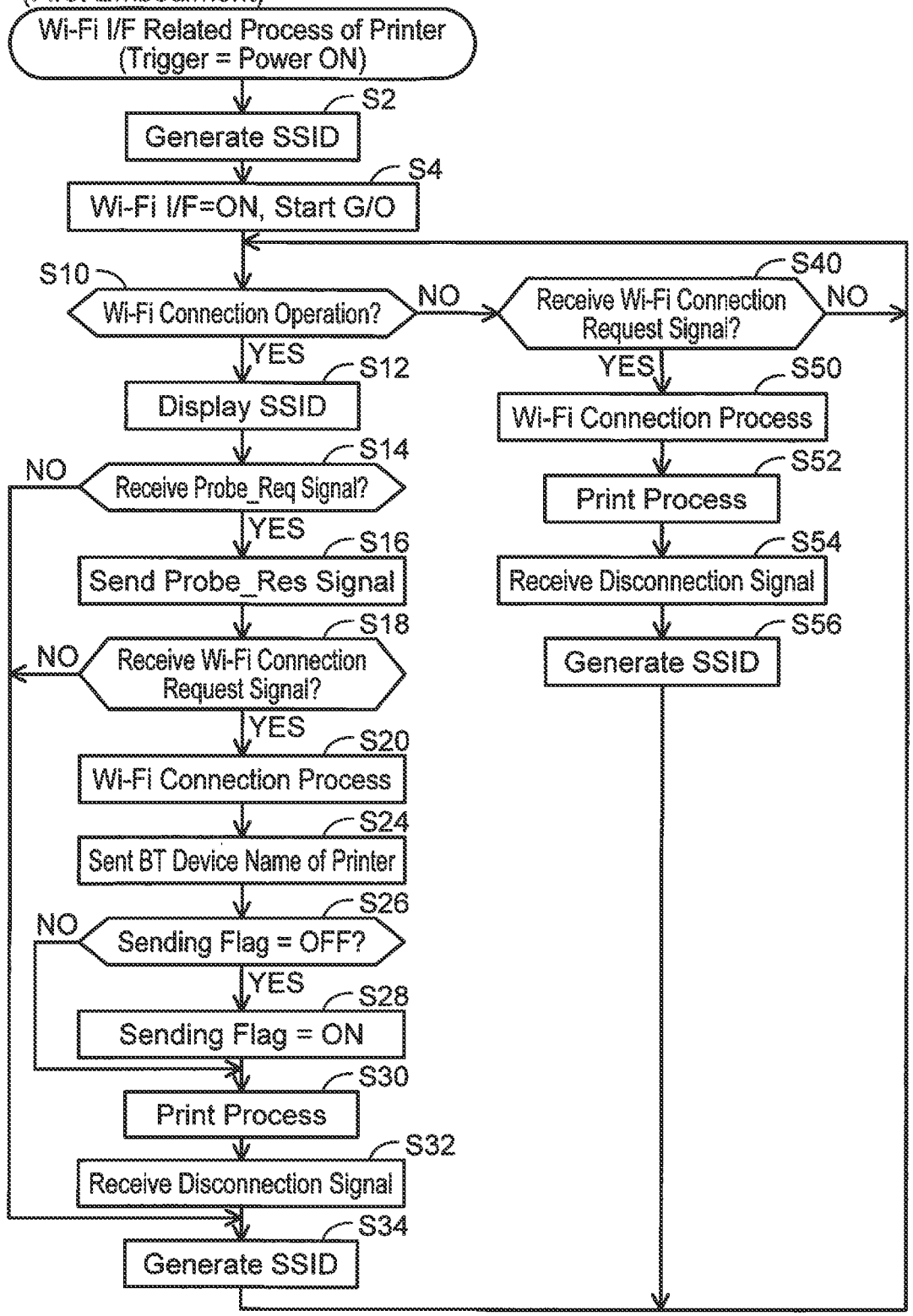

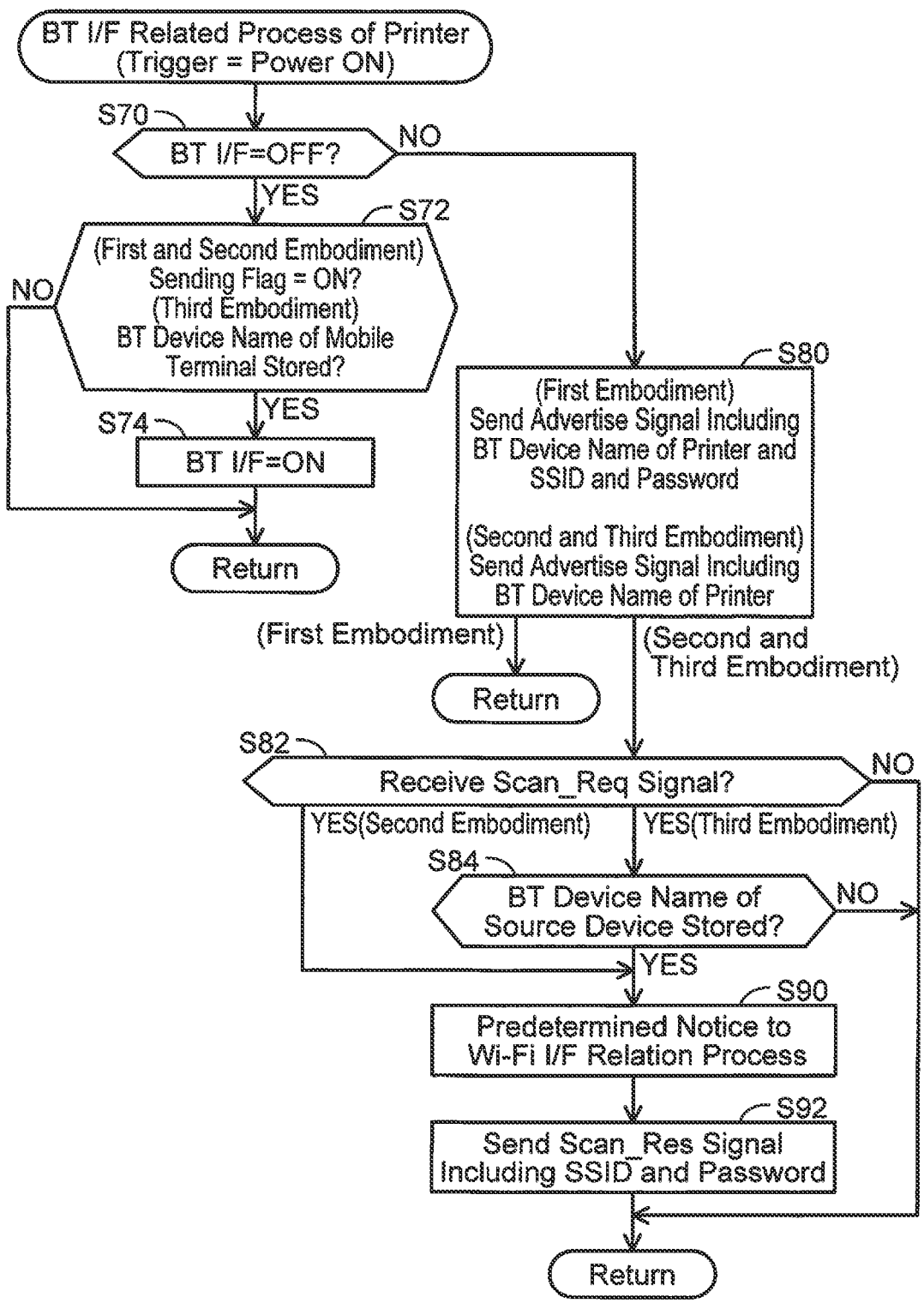

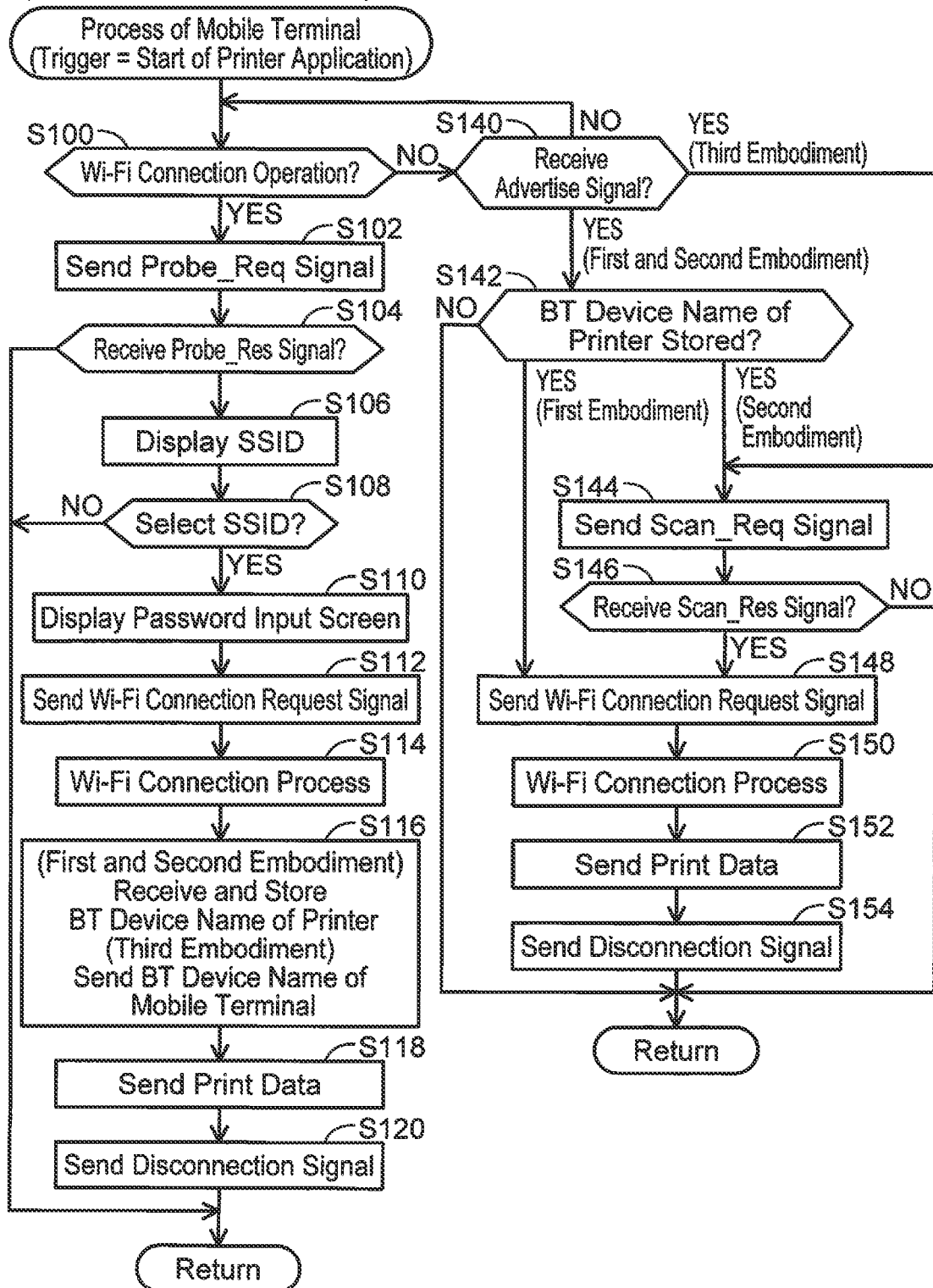

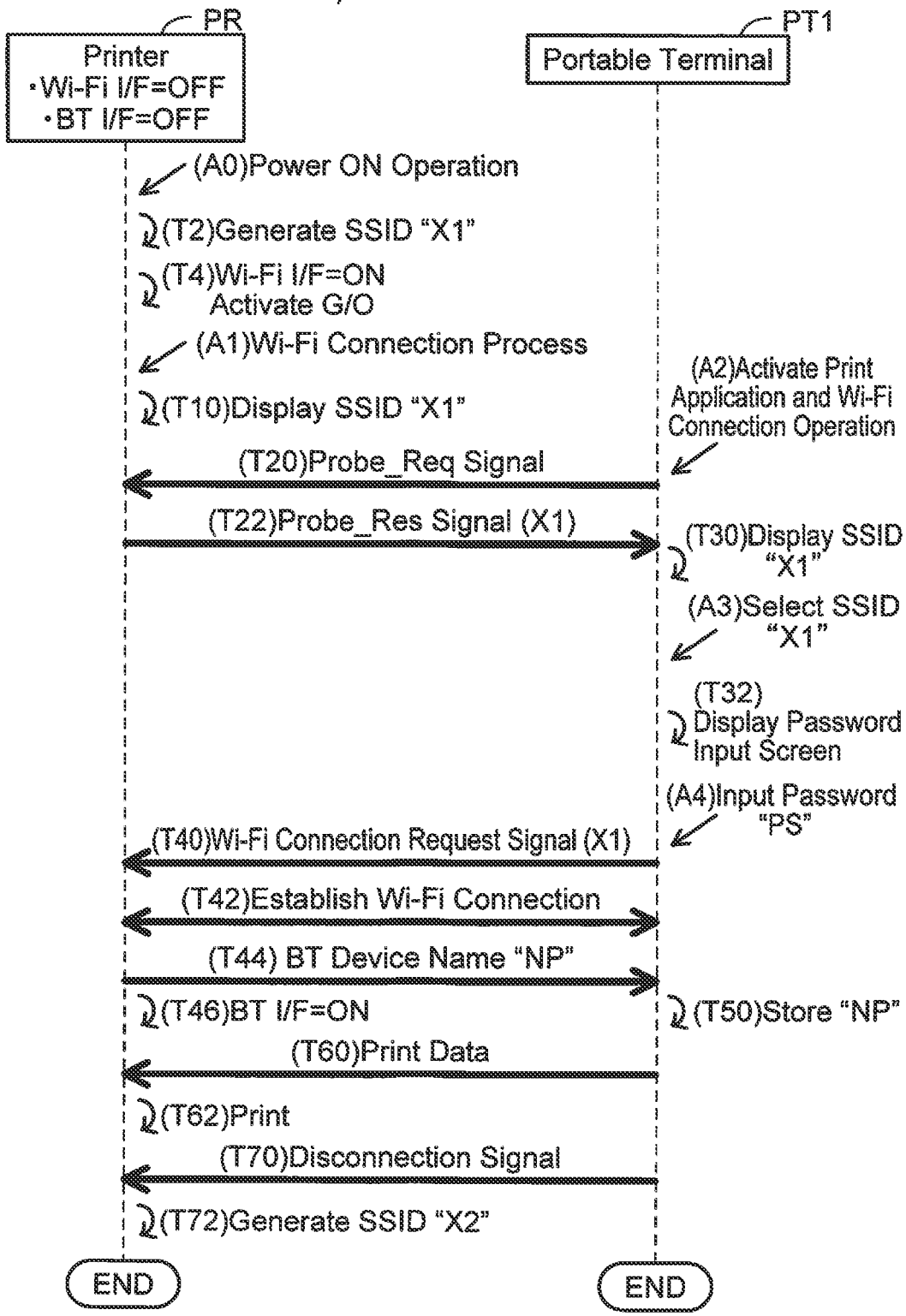

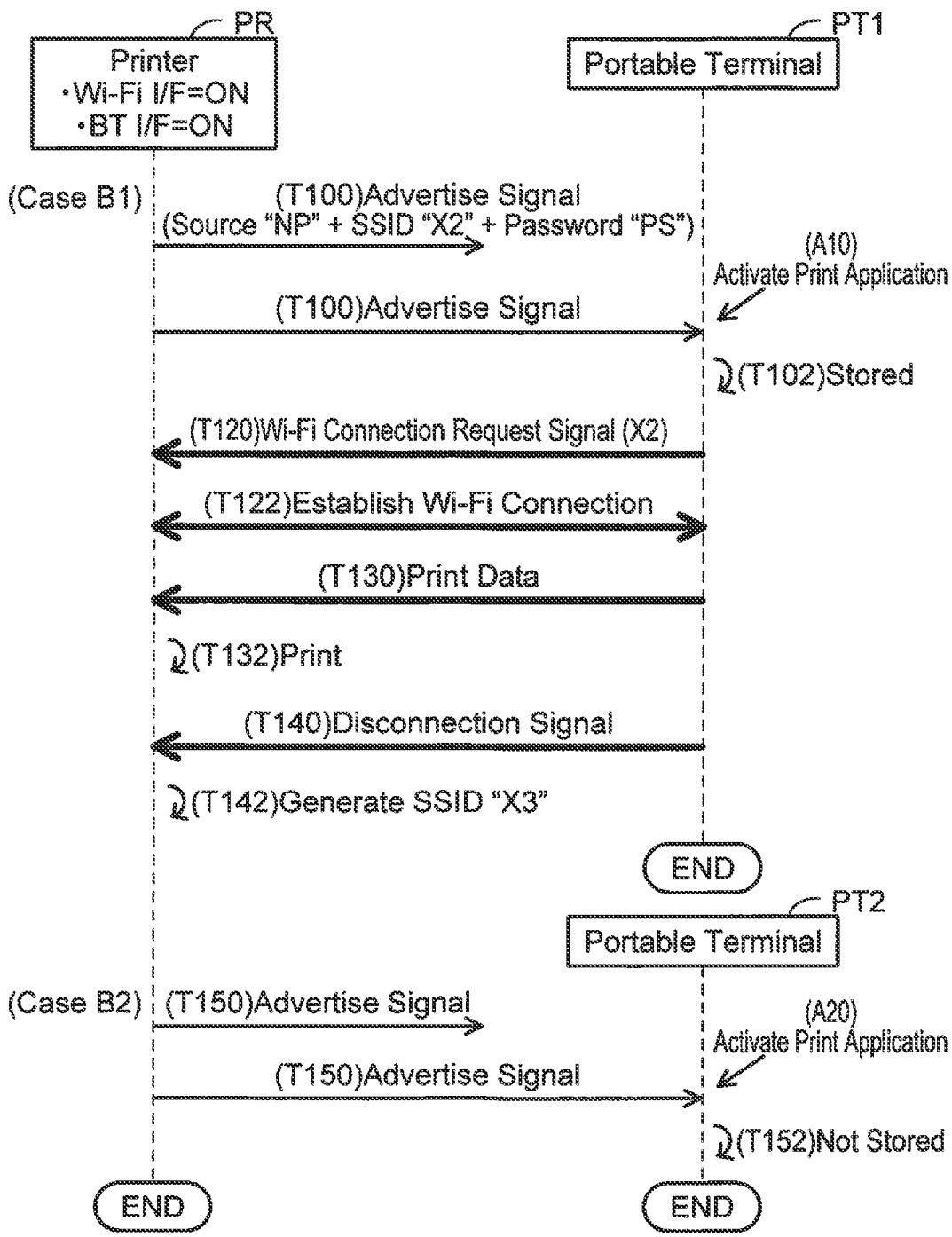

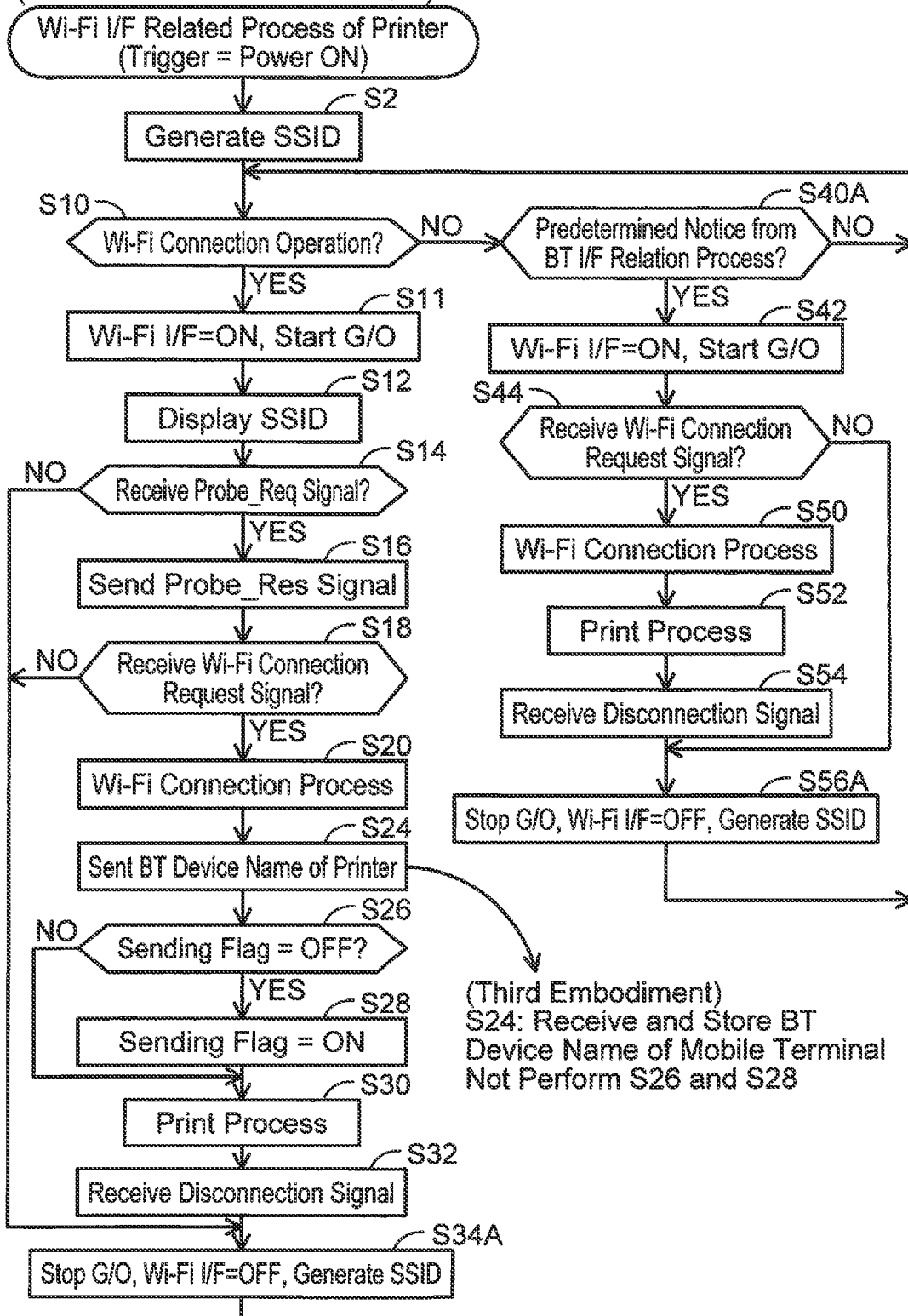

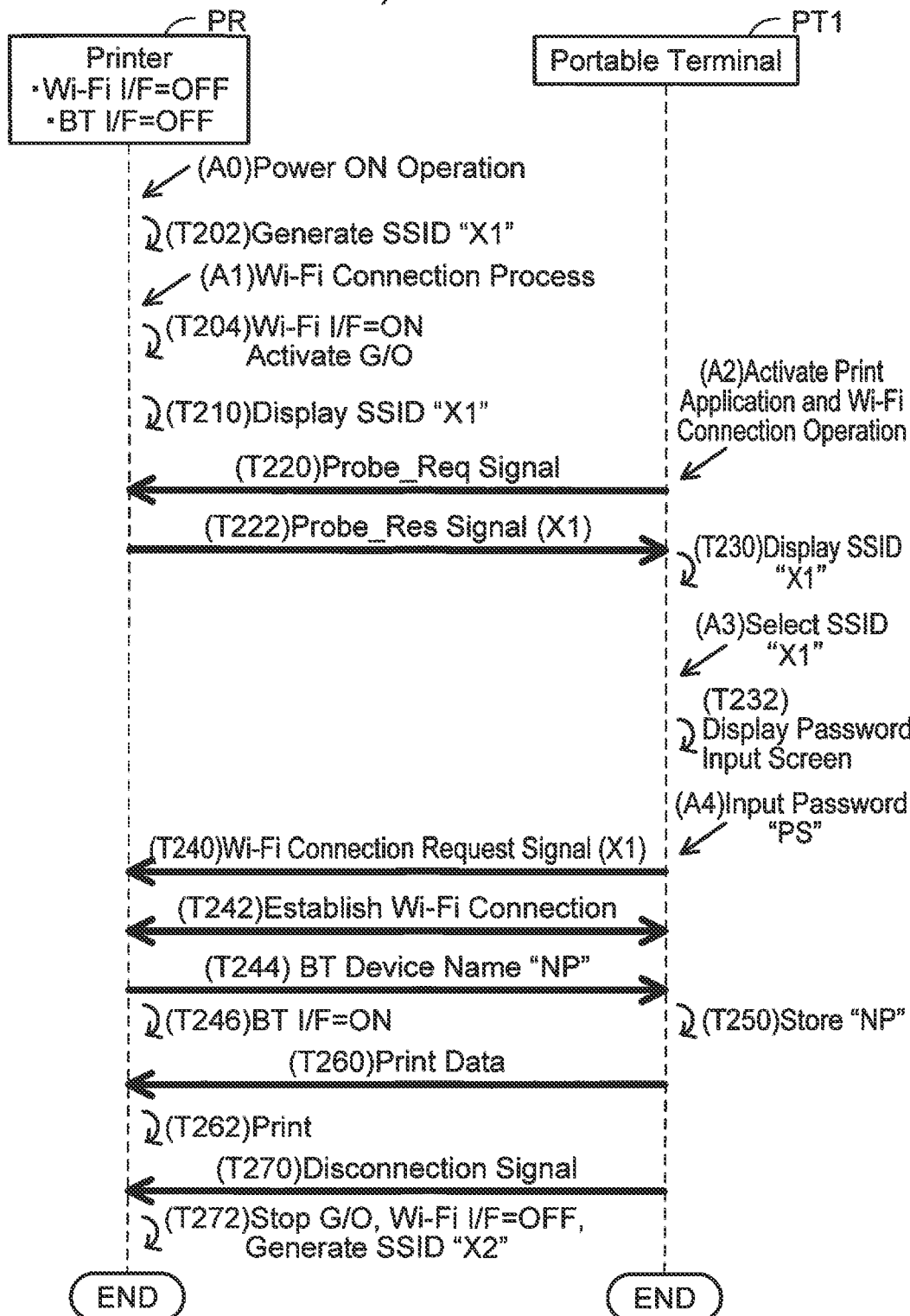

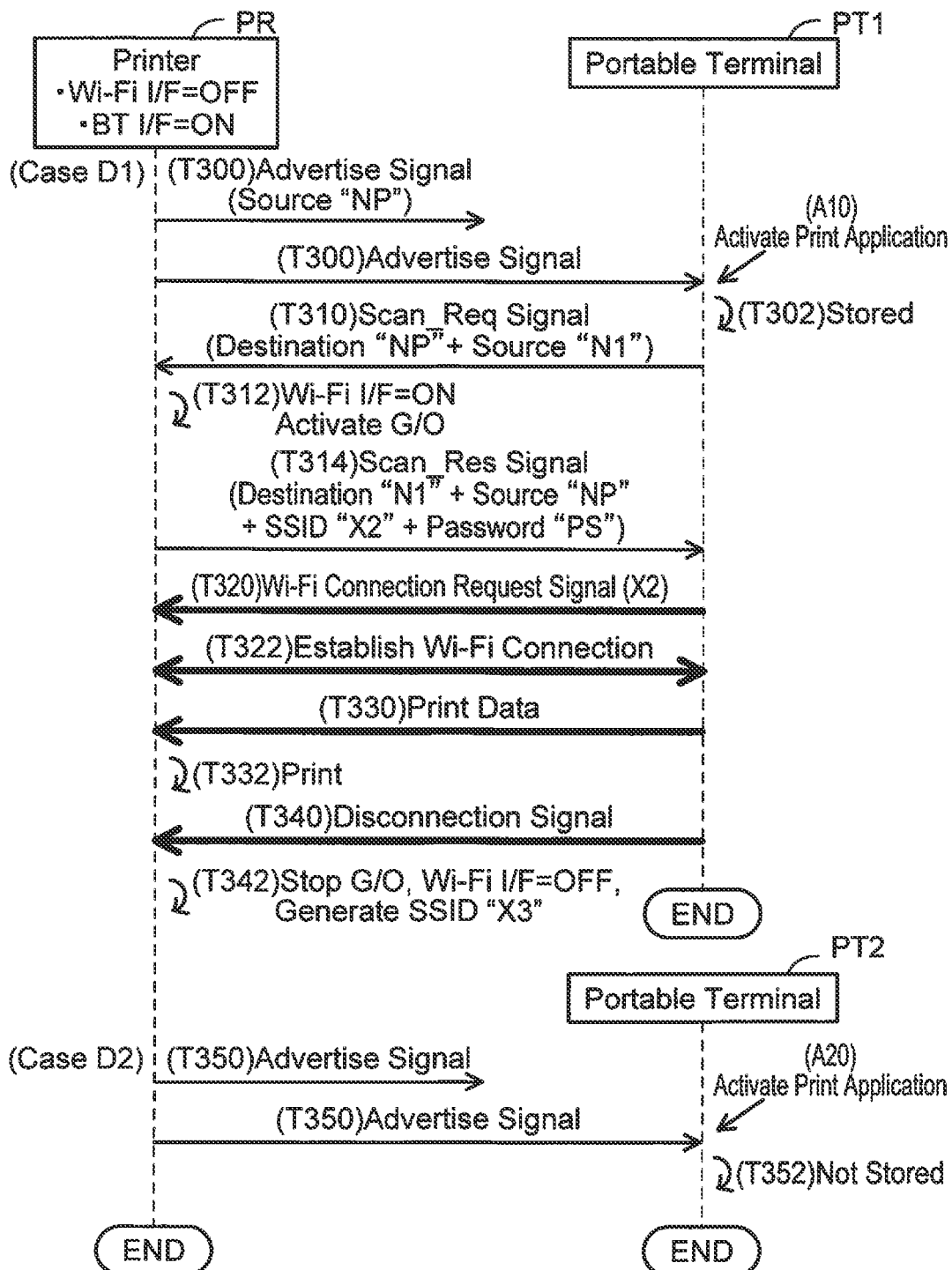

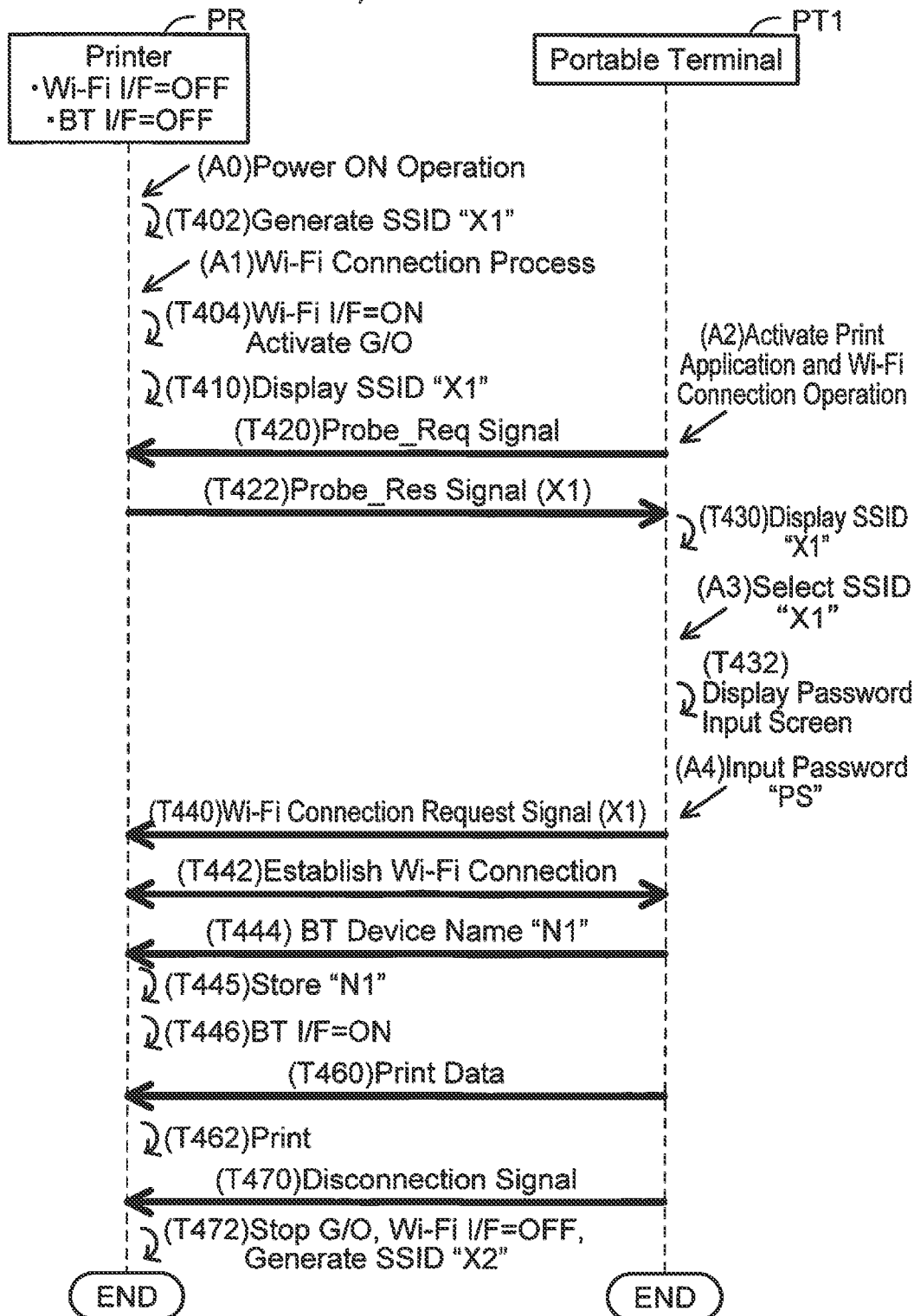

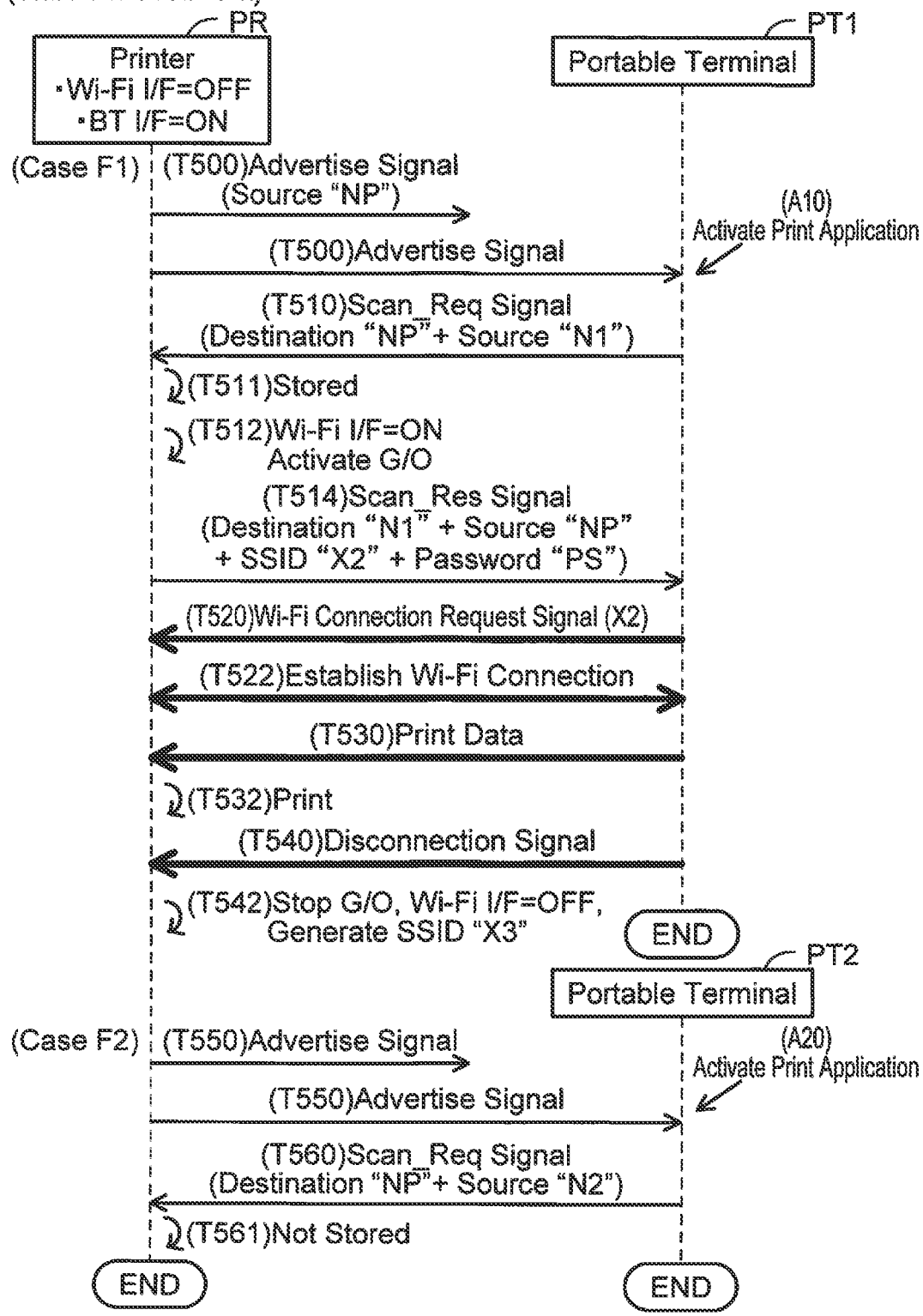

COMMUNICATION APPARATUS

CROSS-REFERENCE TO RELATED APPLICATION

This application is continuation application of U.S. application Ser. No. 17/482,989 filed on Sep. 23, 2021, which is a continuation application of U.S. application Ser. No. 16/674,270 filed on Nov. 5, 2019, now U.S. Pat. No. 11,159,696 issued on Oct. 26, 2021, which is a continuation application of U.S. application Ser. No. 16/249,071 filed on Jan. 16, 2019, now U.S. Pat. No. 10,506,129 issued on Dec. 10, 2019, which is a continuation application of U.S. application Ser. No. 15/854,889 filed on Dec. 27, 2017, now U.S. Pat. No. 10,205,847 issued on Feb. 12, 2019, which is a continuation application of U.S. application Ser. No. 15/635,959 filed on Jun. 28, 2017, now U.S. Pat. No. 9,860,417 issued on Jan. 2, 2018, which is a continuation application of U.S. application Ser. No. 15/079,264 filed on Mar. 24, 2016, now U.S. Pat. No. 9,712,955 issued on Jul. 18, 2017, which claims priority to Japanese Patent Application No. 2015-066067, filed on Mar. 27, 2015, the entire contents of which are hereby incorporated by reference into the present application.

TECHNICAL FIELD

The present application discloses a communication apparatus capable of performing a wireless communication according to a plurality of communication schemes.

BACKGROUND ART

Technology for performing a wireless communication between a first terminal and an external apparatus according to Wi-Fi is known. The first terminal sends, to the external apparatus via a BLE (abbreviation of Bluetooth (registered trademark) Low Energy), information (i.e. a MAC address, an SSID, a channel number, a security key, and so forth) related to AP (abbreviation of an access point) to which the first terminal itself is connected. In this case, the external apparatus activates a Wi-Fi module, and uses the above information to connect to the AP. This makes it possible for the first terminal and the external apparatus to perform a wireless communication according to Wi-Fi.

SUMMARY

The present application discloses a new technology for a communication apparatus to form a wireless network according to a first communication scheme after having performed a wireless communication according to a second communication scheme.

A first communication apparatus may comprise a first interface configured to perform a wireless communication according to a first communication scheme; a second interface configured to perform a wireless communication according to a second communication scheme different from the first communication scheme, the second interface configured to repeat a broadcast transmission of a trigger signal, the trigger signal being a signal to be used by a second communication apparatus as a trigger for sending a wireless connection request to the first communication apparatus, the wireless connection request being for forming a first wireless network to which both the first communication apparatus and the second communication apparatus belong, and the first wireless network being for performing a wireless communication via the first interface; a processor; and a memory that stores computer-readable instructions therein, the computer-readable instructions, when executed by the processor, causing the first communication apparatus to perform: receiving the wireless connection request via the first interface from the second communication apparatus which has received the trigger signal; and in response to receiving the wireless connection request from the second communication apparatus, establishing a first wireless connection via the first interface with the second communication apparatus so as to form the first wireless network to which both the first communication apparatus and the second communication apparatus belong.

A control method and computer-readable instructions for implementation of the first communication apparatus described above, and a non-transitory computer-readable recording medium in which the computer-readable instructions are stored, are also novel and useful.

The present application further discloses a non-transitory computer-readable recording medium storing computer-readable instructions for a second communication apparatus. The second communication apparatus may comprise a first interface configured to perform a wireless communication according to a first communication scheme; and a second interface configured to perform a wireless communication according to a second communication scheme different from the first communication scheme; and a processor. The computer-readable instructions, when executed by the processor, may cause the second communication apparatus to perform: receiving a trigger signal from a first communication apparatus via the second interface in a case where the first communication apparatus repeats a broadcast transmission of the trigger signal, the trigger signal being a signal to be used by the second communication apparatus as a trigger for sending a wireless connection request to the first communication apparatus, the wireless connection request being for forming a first wireless network to which both the first communication apparatus and the second communication apparatus belong, the first wireless network being for performing wireless communication via the first interface; in response to receiving the trigger signal from the first communication apparatus, sending the wireless connection request to the first communication apparatus via the first interface; and in response to sending the wireless connection request to the first communication apparatus, establishing a first wireless connection via the first interface with the first communication apparatus so as to form the first wireless network to which both the first communication apparatus and the second communication apparatus belong.

The second communication apparatus described above itself is also novel and useful. Moreover, a communication system comprising the first communication apparatus and the second communication apparatus described above is also novel and useful.

BRIEF DESCRIPTION OF DRAWINGS

FIG. 2 shows a flowchart of a Wi-Fi I/F relation process of a printer.
FIG. 3 shows a flowchart of a BT I/F relation process of a printer.
FIG. 4 shows a flowchart of a process of mobile terminal.
FIG. 5 shows a sequence chart for a case A of a first embodiment.
FIG. 6 shows sequence charts for cases B1 and B2 of the first embodiment.

FIG. 7 shows a flowchart of a Wi-Fi I/F relation process of a printer of a second embodiment and a third embodiment.

FIG. 8 shows a sequence chart for a case C of the second embodiment.

FIG. 9 shows a sequence chart for cases D1 and D2 of the second embodiment.

FIG. 10 shows a sequence chart for a case E of the third embodiment.

FIG. 11 shows a sequence chart for cases F1 and F2 of the third embodiment.

EMBODIMENTS

First Embodiment

Configuration of Communication System 2

Figure 1:
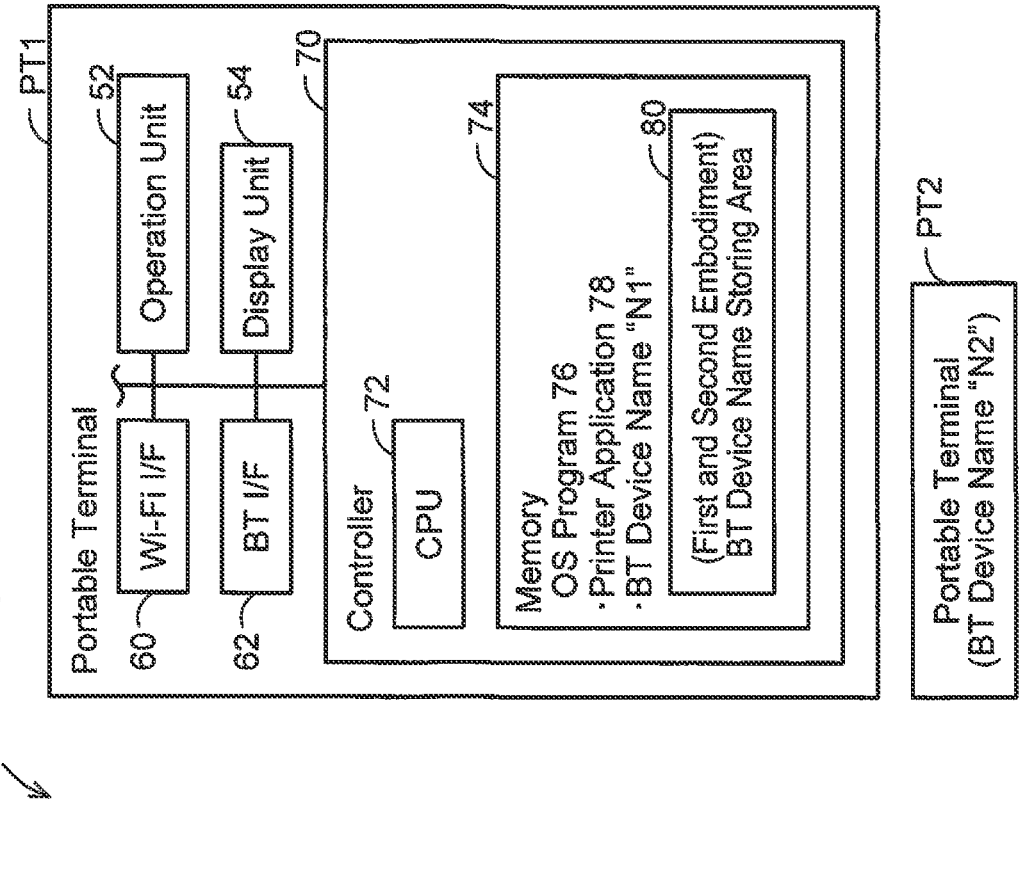
FIG. 1 shows a configuration of a communication system.
Figure 1:
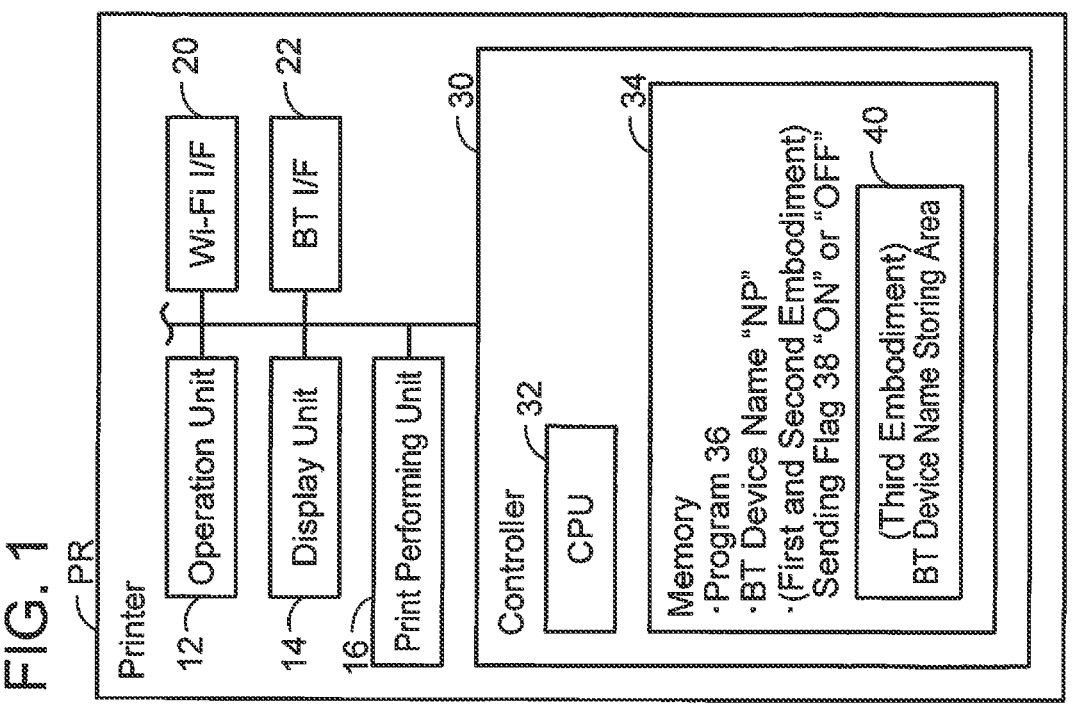

As shown in FIG. 1, a communication system 2 comprises a printer PR and a plurality of portable terminals PT1 and PT 2. The printer PR and the portable terminals PT1 and PT 2 are able to perform a wireless communication with one another.

Configuration of Printer PR

The printer PR is a peripheral device that is capable of performing a print function, that is, a peripheral device such as the portable terminal PT1. The printer PR comprises an operation unit 12, a display unit 14, a print performing unit 16, a Wi-Fi interface 20, a BT (abbreviation for Bluetooth (registered trademark)) interface 22, and a controller 30. Each of the units 12 to 30 is connected to a bus line (reference sign omitted).

The operation unit 12 comprises a plurality of keys. A user can input various instructions into the printer PR by operating the operation unit 12. The display unit 14 is a display for displaying various information. The display unit 14 also functions as a so-called touch panel. That is, the display unit 14 also functions as an operation unit operated by the user. The print performing unit 16 is a printing mechanism such as an inkjet system or laser system.

The Wi-Fi I/F 20 is an I/F for performing a wireless communication according to a Wi-Fi scheme (hereinafter called "Wi-Fi communication"). The Wi-Fi scheme, for example, is a wireless communication scheme based on The Institute of Electrical and Electronics Engineers, Inc. (IEEE) standard 802.11, and standards conforming thereto (e.g. 802.11a, 11b, 11g, 11n, and so forth). More specifically, the Wi-Fi I/F 20 supports a WFD (abbreviation of Wi-Fi Direct (registered trademark)) scheme formulated by a Wi-Fi Alliance. The WFD scheme is a wireless communication scheme described in a "Wi-Fi Peer-to-Peer (P2P) Technical Specification Version 1.1" prepared by the Wi-Fi Alliance.

The BT I/F 22 is an I/F for performing a wireless communication (hereinafter called "BT communication") according to a Bluetooth scheme. The Bluetooth scheme, for example, is a wireless communication scheme based on IEEE standard 802.1.5, and standards conforming thereto. More specifically, the BT I/F 22 supports BLE (abbreviation of Bluetooth Low Energy). The BLE is a standard that is realized using version 4.0 or a later version of the Bluetooth scheme. Hereinafter, Bluetooth version lower than 4.0 will be called "classic BT". In order for a BT communication to be performed according to BLE between a pair of BT I/Fs, the one BT I/F may support "Bluetooth Smart Ready" established using the BT scheme, and the other BT I/F may support "Bluetooth Smart Ready" or "Bluetooth Smart" established using the BT scheme. A BT I/F that supports "Bluetooth Smart Ready" is an I/F that is capable of performing both a BLE operation and a classic BT operation (i.e. a so-called dual mode I/F). A BT I/F that supports "Bluetooth Smart" is an I/F that is capable of performing a BLE operation, but is not capable of performing a classic BT operation. In the present embodiment, a BT communication according to BLE is performed between the printer PR and the portable terminals PT1 and PT 2. Then, since the BT I/F (e.g. reference sign 62) of the portable terminals PT1 and PT 2, which will be explained below, supports "Bluetooth Smart Ready", the BT I/F 22 of the printer PR may support whichever of "Bluetooth Smart Ready" and "Bluetooth Smart". However, in a variation, the BT I/F of the portable terminals PT1 and PT 2 may support "Bluetooth Smart" when the BT I/F 22 of the printer PR supports "Bluetooth Smart Ready".

The points of difference between classic BT and BLE will be described. The number of BLE channels (i.e. 40) is less than the number of classic BT channels (i.e. 79). Current consumption of a BLE (e.g. 15 mA) at the time of a data communication is less than the current consumption of a classic BT (e.g. 35 mA) at the time of a data communication. Therefore, BLE power consumption is lower than the power consumption of the classic BT. Also, an Advertise signal is used in BLE, but an Advertise signal is not used in classic BT.

The points of difference between the Wi-Fi scheme and the BT scheme will be described. The communication speed of a Wi-Fi communication (e.g. a maximum communication speed of 600 Mbps) is faster than the communication speed of a BT communication (e.g. maximum communication speed of 24 Mbps). The frequency of the carrier wave in a Wi-Fi communication is either a 2.4 GHz range or a 5.0 GHz range. The frequency of the carrier wave in a BT communication is the 2.4 GHz range. That is, in a case where the 5.0 GHz range is used as the carrier wave frequency in a Wi-Fi communication, the carrier wave frequency in the Wi-Fi communication differs from the carrier wave frequency in the BT communication. Furthermore, the maximum distance over which a Wi-Fi communication can be performed (e.g. approximately 100 m) is greater than the maximum distance over which a BT communication can be performed (e.g. roughly several tens of meters).

The controller 30 comprises a CPU 32 and a memory 34. The CPU 32 performs various processes in accordance with a program 36 stored in the memory 34. The memory 34 is configured by a volatile memory and a nonvolatile memory. The memory 34 stores a BT device name "NP" of the printer PR and a sending flag 38. The BT device name "NP" is a unique name allocated to the BT I/F 22, in other words, it is a name that is used as information for identifying the printer PR in order for the printer PR to perform the BT communication. The sending flag 38 indicates "ON" in a case where the BT device name "NP" has been sent to an exterior, and indicates "OFF" in a case where the BT device name "NP" has not been sent to the exterior. FIG. 1 shows that the memory 34 comprises an area 40, and the area 40 is used in a third embodiment, which will be explained below.

Configuration of Portable Terminals PT1 and PT 2

The portable terminals PT1 and PT 2, for example, are portable terminal devices such as mobile telephones (e.g. smart phones), PDAs, notebook PCs, tablet PCs, portable music players, and portable video players. The configuration of the portable terminal PT1 will be explained below, but portable terminal PT 2 comprises the same configuration as that of portable terminal PT1.

The portable terminal PT1 comprises an operation unit 52, a display unit 54, a Wi-Fi I/F 60, a BT I/F 62, and a controller 70. Each of the units 52 to 70 is connected to a bus line (reference sign omitted).

The operation unit 52 comprises a plurality of keys. A user can input various instructions into the portable terminal PT1 by operating the operation unit 52. The display unit 54 is a display for displaying various information. The display unit 54 also functions as a so-called touch panel (i.e. also functions as an operation unit). The Wi-Fi I/F 60 is an I/F for performing a Wi-Fi communication. The Wi-Fi I/F 60 may or may not support WFD. The BT I/F 62 is an I/F for performing a BT communication, and supports BLE. The differences between the respective I/Fs 60 and 62 are the same as the differences between the respective I/Fs 20 and 22 of the printer PR.

The controller 70 comprises a CPU 72 and a memory 74. The CPU 72 performs various processes in accordance with an OS program 76 stored in the memory 74. The memory 74 is configured by a volatile memory and a nonvolatile memory. The memory 74 not only stores the OS program 76, but also a printer application 78. The printer application 78 is an application for causing a print function to be performed on the printer PR. The printer application 78 is started by the user when the user wishes to cause a print function to be performed on the printer PR. The application 78, for example, may be installed in the portable terminal PT1 from an Internet server provided by the vendor of the printer PR, or may be installed in the portable terminal PT1 from storage media shipped together with the printer PR.

The memory 74 also stores a BT device name "N1" of the portable terminal PT1. The BT device name "N1" is a unique name allocated to the BT I/F 62, in other words, it is a name used as information for identifying the portable terminal PT1 in order for the portable terminal PT1 to perform a BT communication. Furthermore, the portable terminal PT 2 has the BT device name "N2", which differs from the BT device name "N1". The memory 74 comprises a BT device name storing area 80. The BT device name storing area 80 is an area for storing a BT device name of a printer with which a wireless connection, that is, a wireless connection according to the Wi-Fi scheme, has been established via the Wi-Fi I/F 60.

Wi-Fi I/F Relation Process of Printer PR; FIG. 2

Next, a Wi-Fi I/F relation process performed by the CPU 32 of the printer PR will be explained by referring to FIG. 2. The Wi-Fi I/F relation process is a process related primarily to the Wi-Fi I/F 20. The CPU 32 commences the process of FIG. 2 when the power supply of the printer PR is turned ON.

In S2, the CPU 32 generates SSID (abbreviation of a service set identifier) by randomly generating a character string. Then, the CPU 32 causes the SSID to be stored in the memory 34. The SSID is an identifier for identifying a wireless network for performing a Wi-Fi communication.

In S4, the CPU 32 shifts the Wi-Fi I/F 20 from the OFF state to the ON state. As used here, the OFF state of the Wi-Fi I/F 20 is a state in which power is not being supplied to the Wi-Fi I/F 20, that is, a state in which a Wi-Fi communication cannot be performed. The ON state of the Wi-Fi I/F 20 is a state in which power is being supplied to the Wi-Fi I/F 20, that is, a state in which a Wi-Fi communication can be performed.

In S4, the CPU 32 spontaneously causes the operating state of the printer PR to shift from a device state of WFD to a G/O (abbreviation of group owner) state without performing a WFD G/O negotiation. When in the G/O state, the printer PR sends a beacon signal via the Wi-Fi I/F 20 to inform surrounding apparatuses of its existence. On the other hand, when in a state other than the G/O state (e.g. the aforementioned device state or a client state), the printer PR does not send a beacon signal. Thus, the power consumption of the printer PR when in the G/O state is higher than the power consumption of the printer PR when in a state other than the G/O state.

Next, the CPU 32 sequentially performs monitoring processes of S10 and S40. In S10, the CPU 32 monitors for a Wi-Fi connection operation to be performed by the user on either the operating unit 12 or the display unit 14 (i.e. the touch panel) of the printer PR. The Wi-Fi connection operation is an operation for establishing a wireless connection according to the Wi-Fi scheme (hereinafter called "Wi-Fi connection") between the printer PR and the portable terminal (e.g. PT1). The Wi-Fi connection operation is performed by the user of the portable terminal for which a Wi-Fi connection has not been established with the printer PR in the past. The CPU 32 determines YES in S10 when the Wi-Fi connection operation is performed, and proceeds to S12.

In S12, the CPU 32 obtains the SSID from the memory 34, and causes the display unit 14 to display the obtained SSID. This makes it possible for the user to find out the SSID required for establishing a Wi-Fi connection with the printer PR by looking at the display unit 14. Furthermore, as described above, the SSID is stored in the memory 34 in S2. However, when S34 or S56, which will be described below, are performed after S2 was performed, a new SSID is stored in the memory 34 in place of an old SSID in the memory 34. Therefore, in a situation in which neither S34 nor S56 has been performed after S2 was performed, the SSID displayed in S12 is the SSID that was generated in S2. In a situation in which either S34 or S56 has been performed after S2 was performed, the SSID displayed in S12 is a new SSID that was generated in either S34 or S56. Hereinafter, the SSID currently stored in the memory 34 will be called "current SSID".

In S14, the CPU 32 determines whether or not a Probe Request signal (hereinafter written as "Probe_Req signal") has been received from the portable terminal via the Wi-Fi I/F 20. The Probe_Req signal is a broadcast transmission signal from the portable terminal, and more specifically, is a signal for searching for a G/O state apparatus and an AP that exist around the portable terminal. The CPU 32 determines YES in S14 when the Probe_Req signal has been received, and proceeds to S16. On the other hand, the CPU 32 determines NO in S14 when a Probe_Req signal has not been received during a predetermined period of time after S12 has ended, skips S16 to S32, and proceeds to S34.

In S16, the CPU 32 sends a Probe Response signal (hereinafter written as "Probe_Res signal") including the current SSID to a portable terminal via the Wi-Fi I/F 20. The Probe_Res signal is a response signal to the Probe_Req signal. The portable terminal, upon receiving the Probe_Res signal, displays the SSID included in the Probe_Res signal on the display unit of the portable terminal. At this point, the user of the portable terminal is able to ascertain that the SSID being displayed on the display unit of the portable terminal is a SSID of which apparatus by comparatively checking the SSID being displayed on the display unit of the portable terminal to the SSID that was displayed on the display unit 14 of the printer PR in S12 described above, and may select the current SSID of the printer PR. This makes it possible for the user to instruct the portable terminal to send a Wi-Fi connection request signal, which will be explained below.

In S18, the CPU 32 determines whether or not a Wi-Fi connection request signal including the current SSID has been received from the portable terminal via the Wi-Fi I/F 20. The Wi-Fi connection request signal is a signal for requesting the printer PR to establish a Wi-Fi connection, and more specifically, is an Association Request signal. The CPU 32 determines YES in S18 when a Wi-Fi connection request signal including the current SSID has been received, and proceeds to S20. On the other hand, the CPU 32 determines NO in S18 when a Wi-Fi connection request signal including the current SSID has not been received during a predetermined period of time after S16 has ended, skips S20 to S32, and proceeds to S34.

In S20, the CPU 32 establishes a wireless connection via the Wi-Fi I/F 20 (i.e. a Wi-Fi connection) with the portable terminal. Specifically, the CPU 32 performs a communication with the portable terminal via the Wi-Fi I/F 20 using various types of signals (e.g. sends an Association Response signal, communicates a 4-way Handshake, and so forth). The CPU 32, in the process of communicating the aforementioned various types of signals, receives Wi-Fi setting information including the SSID and a password from the portable terminal, and performs an authentication of the Wi-Fi setting information. The CPU 32 determines that the authentication of the Wi-Fi setting information has been successful and establishes a Wi-Fi connection with the portable terminal in a case where the received SSID is identical to the current SSID, and the received password is identical to a predetermined password. As used here, the predetermined password is a fixed character string that has been set in the printer PR beforehand. That is, in the present embodiment, when the power supply to the printer PR is turned ON and either S34 or S56, which will be explained below, is performed, the SSID changes, but the password does not change.

As explained above, a Wi-Fi connection is established between the printer PR and the portable terminal in S20. Consequently a wireless network of Wi-Fi-scheme (hereinafter written as "Wi-Fi network") in which the printer PR operates in the G/O state and the portable terminal operates as a so-called legacy, is formed. Legacy signifies an apparatus that participates in the Wi-Fi network without performing a WFD operation. Since the printer PR that is in the G/O state manages a Wi-Fi network, printer PR that is the G/O-state can be called a parent station (in other words, a master device) of the Wi-Fi network. Also, since the portable terminal participates in the Wi-Fi network as a legacy, the legacy portable terminal can be called a child station (in other words, a slave device) of the Wi-Fi network.

In S24, the CPU 32 uses the Wi-Fi network (i.e. uses the Wi-Fi connection) so as to send the printer PR BT device name "NP" in the memory 34 to the portable terminal via the Wi-Fi I/F 20.

In S26, the CPU 32 determines whether or not the sending flag 38 in the memory 34 indicates "OFF". In a case where it is determined that the sending flag 38 indicates "OFF" (YES in S26), in S28, the CPU 32 changes the sending flag 38 to "ON" and proceeds to S30. On the other hand, in a case where it is determined that the sending flag 38 indicates "ON" (NO in S26), the CPU 32 skips S28, and proceeds to S30.

In S30, the CPU 32 uses the Wi-Fi network so as to receive print data representing an image to be printed from the portable terminal via the Wi-Fi I/F 20. Then, the CPU 32 supplies the print data to the print performing unit 16, and causes the print performing unit 16 to print in accordance with the print data.

In S32, the CPU 32 uses the Wi-Fi network so as to receive a disconnection signal from the portable terminal via the Wi-Fi I/F 20. The disconnection signal is a signal for requesting the disconnection of the Wi-Fi connection. As a result of this, the Wi-Fi connection between the printer PR and the portable terminal is disconnected.

In S34, the CPU 32 generates a new SSID, and causes the new SSID to be stored in the memory 34 in place of an old SSID in the memory 34. That is, the CPU 32 changes the SSID. Therefore the security of the Wi-Fi network may be enhanced since the SSID changes. When S34 ends, the CPU 32 returns to S10.

In S40, the CPU 32 monitors for the receiving of the Wi-Fi connection request signal including the current SSID from the portable terminal via the Wi-Fi I/F 20 without the Wi-Fi connection operation being performed (NO in S10). In a case where the Wi-Fi connection request signal including the current SSID is received, the CPU 32 determines YES in S40, and proceeds to S50. S50, S52, S54, and S56, respectively, are the same as S20, S30, S32, and S34. When S56 ends, the CPU 32 returns to S10.

BT I/F Relation Process of Printer PR; FIG. 3

Next, a BT I/F relation process performed by the CPU 32 of the printer PR will be explained by referring to FIG. 3. The BT I/F relation process is a process related primarily to the BT I/F 22. The CPU 32 starts the process of FIG. 3 when the power supply to the printer PR is turned ON.

In S70, the CPU 32 determines whether or not the BT I/F 22 is in the OFF state. The CPU 32 determines YES in S70 and proceeds to S72 in a case where the CPU 32 inquires the state of the BT I/F 22 of the BT I/F 22 and obtains information indicating the OFF state from the BT I/F 22, and CPU 32 determines NO in S70 and proceeds to S80 in a case where the CPU 32 obtains information indicating the ON state from the BT I/F 22. Here, the OFF state of the BT I/F 22 is a state in which power is not supplied to the BT I/F 22, that is, a state in which a BT communication cannot be performed. The ON state of the BT I/F 22 is a state in which power is being supplied to the BT I/F 22, that is, a state in which a BT communication can be performed. The power consumption (i.e. the power consumption of the BLE) of the BT I/F 22 in the ON state is lower than the power consumption of the Wi-Fi I/F 20 in the ON state.

In S72, the CPU 32 determines whether or not the sending flag 38 in the memory 34 indicates "ON". In a case where it is determined that the sending flag 38 indicates "ON" (YES in S72), in S74, the CPU 32 shifts the BT I/F 22 from the OFF state to the ON state. The BT I/F 22 can be set to the OFF state until the BT I/F 22 is shifted to the ON state in S74, thereby making it possible to reduce the power consumption of the printer PR. In a case where it is determined that the sending flag 38 indicates "OFF" (NO in S72), the CPU 32 skips S74, and returns to S70.

In S80 (i.e. the BT I/F 22 is in the ON state), first, the CPU 32 obtains the BT device name "NP" of the printer PR, the current SSID, and a predetermined password from the memory 34. Then, the CPU 32 performs a broadcast transmission of the Advertise signal including the obtained respective types of information via the BT I/F 22. The broadcast transmission here is a signal of which destination is not specified. That is, the Advertise signal includes the BT device name "NP" as information indicating its source (sender), but does not include information indicating its destination. The Advertise signal is a signal for notifying apparatuses around the printer PR of the printer's existence. In particular, the CPU 32 sends the Advertise signal to the exterior without establishing a Bluetooth logical link (i.e. a Bluetooth-scheme wireless connection). More specifically, in a Bluetooth protocol stack, the signal is sent to the exterior by a communication of a layer lower than a L2CAP layer (i.e. Link Manager layer or Link Layer layer), being performed without a communication of a layer higher than or equal to the L2CAP layer being performed. The L2CAP layer is a highest layer for establishing a Bluetooth logical link. That is, the Advertise signal is sent to the exterior by a communication of a lower layer which is lower than the highest layer for establishing a logical link being performed without a communication of the highest layer being performed.

When S80 ends, the CPU 32 returns to S70. Then, in a case where S80 is performed again following a NO in S70, the CPU 32 once again performs a broadcast transmission of the Advertise signal. That is, the CPU 32 repeats the broadcast transmission of the Advertise signal.

Process of Portable Terminal PT1; FIG. 4

Next, a process performed by the CPU 72 of the portable terminal PT1 will be explained by referring to FIG. 4. Notably, a portable terminal PT2 is capable of performing the same process. When an operation for activating the printer application 78 is performed on the portable terminal PT1, the CPU 72 starts the process of FIG. 4 in accordance with the printer application 78. Furthermore, operations related to the portable terminal PT1 may be performed on the operation unit 52 or on the display unit 54 (i.e. the touch panel). The same holds true herein below as well.

The CPU 72 repeats sequential performing of monitor processes of S100 and S140. In S100, the CPU 72 monitors for the Wi-Fi connection operation to be performed on the portable terminal PT1 by the user. The Wi-Fi connection operation is normally performed by the user of the portable terminal for which a Wi-Fi connection to the printer PR has not been established in the past. In a case where the Wi-Fi connection operation is performed, the CPU 72 determines YES in S100, and proceeds to S102.

In S102, the CPU 72 performs a broadcast transmission of the Probe_Req signal via the Wi-Fi I/F 60. The Probe_Req signal may be received by the printer PR if a distance between the printer PR and the portable terminal PT1 is shorter than a distance over which a Wi-Fi communication can be performed (refer to YES in S14 of FIG. 2).

In S104, the CPU 72 determines whether or not the Probe_Res signal has been received via the Wi-Fi I/F 60. The CPU 72 receives the Probe_Res signal from the printer PR in a case where the printer PR is operating in the G/O state (refer to S16 of FIG. 2). Also, in a case where an AP (abbreviation of Access Point) exists in the vicinity of the portable terminal PT1, the CPU 72 receives the Probe_Res signal from the AP. When one or more Probe_Res signals are received, the CPU 72 determines YES in S104, and proceeds to S106. On the other hand, in a case where no Probe_Res signal has been received during a predetermined time period after S102 ends, the CPU 72 determines NO in S104, skips S106 to S120, and returns to S100.

In S106, the CPU 72 causes one or more SSIDs included in the received one or more Probe_Res signals to be displayed on the display unit 54. The user may perform an operation on the portable terminal PT1 for selecting the current SSID (refer to S12 of FIG. 2) displayed on the printer PR among the one or more SSIDs. That is, the user is able to select the current SSID from among the abovementioned one or more SSIDs by comparing the abovementioned one or more SSIDs to the current SSID displayed on the display unit 14 of the printer PR in S12 of FIG. 2 described above.

In S108, the CPU 72 determines whether or not an operation for selecting one SSID among the one or more SSIDs displayed in S106 has been performed on the portable terminal PT1 by the user. In a case where the operation for selecting the SSID has been performed, the CPU 72 determines YES in S108, and proceeds to S110. In FIG. 4, processes of S110 to S120 are described on a premise that the current SSID of the printer PR is selected. On the other hand, in a case where the operation for selecting an SSID is not performed, that is, in a case where a cancel is instructed by the user, the CPU 72 determines NO in S108, skips S110 to S120, and returns to S100.

In S110, the CPU 72 causes a password input screen to be displayed on the display unit 54. For example, an administrator of the printer PR beforehand notifies the user of the portable terminal PT1 of a predetermined password of the printer PR. Due to this, the user may perform an operation for inputting the predetermined password on the portable terminal PT1. When the operation is performed, the processing proceeds to S112.

In S112, the CPU 72 sends the Wi-Fi connection request signal including the SSID selected in S108 (i.e. the current SSID of the printer PR) to the printer PR via the Wi-Fi I/F 60. The Wi-Fi connection request signal may be received by the printer PR (refer to YES in S18 of FIG. 2).

In S114, the CPU 72 establishes a wireless connection via the Wi-Fi I/F 60 (i.e. the Wi-Fi connection) with the printer PR. Specifically, the CPU 72 performs communications using various types of signals (e.g. receiving an Association Response signal, communicating a 4-Way Handshake, and so forth) with the printer PR via the Wi-Fi I/F 60. In a course of communications using the abovementioned various types of signals, the CPU 72 sends Wi-Fi setting information, which includes the SSID selected in S108 and the password inputted in S110, to the printer PR. In a case where an authentication of the Wi-Fi setting information is successful in the printer PR, the Wi-Fi connection with the printer PR is established. Consequently, there is formed a Wi-Fi network in which the printer PR operates in the G/O state, and the portable terminal PT1 operates as a legacy (refer to S20 of FIG. 2).

In S116, the CPU 72 uses the Wi-Fi network (i.e. uses the Wi-Fi connection) so as to receive the BT device name "NP" of the printer PR from the printer PR via the Wi-Fi I/F 60 (refer to S24 of FIG. 2). Then, the CPU 72 causes the received BT device name "NP" to be stored in the BT device name storing area 80. Consequently, the BT device name of a printer for which the Wi-Fi connection with the portable terminal PT1 has been established (hereinafter called "connection-established printer") is stored in the BT device name storing area 80.

In S118, the CPU 72 uses the Wi-Fi network so as to send print data to the printer PR via the Wi-Fi I/F 60. This makes it possible to cause the printer PR to perform printing of an image represented by the print data (refer to S30 of FIG. 2).

The print data is an image file designated by the user from among one or more image files stored in the memory 74 of the portable terminal PT1. The designation of the image file being a printing target here, for example, may be performed immediately following the activation of the printer application 78, may be performed after the password has been inputted in S110, or may be performed after the Wi-Fi connection with the printer PR has been established in S114.

In S120, in a case where the sending of the print data to the printer PR is complete, the CPU 72 uses the Wi-Fi network so as to send a disconnection signal to the printer PR via the Wi-Fi I/F 60. As a result, the Wi-Fi connection between the printer PR and the portable terminal PT1 is disconnected (refer to S32 of FIG. 2). When S120 ends, the CPU 72 returns to S100.

In S140, the CPU 72 monitors for the receiving of the Advertise signal via the BT I/F 62. As described above, in a case where the sending flag 38 indicates ON, the printer PR repeats the broadcast transmission of the Advertise signal including the BT device name "NP", the current SSID, and the predetermined password (refer to S80 of FIG. 3). Therefore, if the distance between the printer PR and the portable terminal PT1 is shorter than the maximum distance over which it is possible to perform a BT communication, the CPU 72 receives the Advertise signal from the printer PR via the BT I/F 62. In this case, the CPU 72 determines YES in S140, and proceeds to S142.

In S142, the CPU 72 determines whether or not the BT device name in the received Advertise signal (i.e. the received BT device name) is stored in the BT device name storing area 80. As described above, the BT device name storing area 80 stores the BT device name of the connection-established printer (refer to S116). Therefore, the determination of S142 signifies determination whether or not the printer PR which is the source of the Advertise signal is the connection-established printer. In a case where it is determined that the received BT device name is stored in the BT device name storing area 80 (YES in S142), the CPU 72 proceeds to S148. In FIG. 4, processes of S148 to S154 are depicted on a premise that the BT device name "NP" of the printer PR is stored in the BT device name storing area 80. On the other hand, in a case where it is determined that the received BT device name is not stored in the BT device name storing area 80 (NO in S142), the CPU 72 skips S148 to S154, and returns to S100.

In S148, the CPU 72 sends the Wi-Fi connection request signal including the current SSID in the received Advertise signal to the printer PR via the Wi-Fi I/F 60. Due to this, the Wi-Fi connection request signal may be received by the printer PR (refer to YES in S40 of FIG. 2). Thus, as using the receiving of the Advertise signal from the printer PR as a trigger, the CPU 72 sends the Wi-Fi connection request signal to the printer PR. Therefore, the Advertise signal may be called a trigger signal for sending the Wi-Fi connection request signal to the printer PR.

In S150, the CPU 72 established the Wi-Fi connection with the printer PR in the same way as in S114. Here, the CPU 72 establishes the Wi-Fi connection with the printer PR using the Wi-Fi setting information including the current SSID and the password in the received Advertise signal. S152 and S154, respectively, are the same as S118 and S120. When S154 ends, CPU 72 returns to S100.

Specific Cases

Next, specific cases realized by the processes of FIGS. 2 to 4 will be explained by referring to FIGS. 5 and 6. In FIGS. 5 and 6, thick line arrows and thin line arrows between the printer PR and the portable terminals PT1 and PT2 respectively indicate Wi-Fi communications and BT communications.

Case A; FIG. 5

In an initial state of a case A, the power supply to the printer PR is OFF. Also, the portable terminal PT1 has not established the Wi-Fi connection with the printer PR in the past. That is, the BT device name "NP" of the printer PR is not stored in the BT device name storing area 80 of the portable terminal PT1. Furthermore, no BT device names of printer PR are stored in the BT device name storing area 80.

In A0, the power supply to the printer PR is turned ON by the user. In this case, the printer PR generates an SSID "X1" in T2 (S2 of FIG. 2), and in T4, shifts the Wi-Fi I/F 20 to the ON state, and shifts to the G/O state (S4). Next, in A1, the Wi-Fi connection operation is performed on the printer PR by the user of the portable terminal PT1 (YES in S10). In this case, in T10, the printer PR displays the SSID "X1" (S12).

In A2, an operation for activating the printer application 78 and the Wi-Fi connection operation are performed on the portable terminal PT1 by the user (YES in S100 of FIG. 4). In this case, in T20 the portable terminal PT1 performs a broadcast transmission of the Probe_Req signal (S102).

The printer PR, in a case where the Probe_Req signal is received from the portable terminal PT1 (YES in S14 of FIG. 2), in T22, sends the Probe_Res signal including the SSID "X1" to the portable terminal PT1 (S16). Furthermore, if the operation of A2 is not performed on the portable terminal PT1, the Probe_Req signal is not sent from the portable terminal PT1, and as a result, the printer PR determines NO in S14 of FIG. 2.

The portable terminal PT1, in a case where the Probe_Res signal is received from the printer PR (YES in S104 of FIG. 4), in T30, displays the SSID "X1" included in the Probe_Res signal (S106). Furthermore, in a case where the portable terminal PT1 further receives a Probe_Res signal from a different apparatus than the printer PR, the portable terminal PT1 displays not only the SSID "X1", but also a SSID included in that Probe_Res signal. That is, in T30, the portable terminal PT1 displays one or more SSIDs including the SSID "X1". At this point, by comparing the one or more SSIDs displayed on the portable terminal PT1 to the SSID "X1" displayed on the printer PR in the above-described T10, the user can confirm the SSID "X1" of the printer PR from among the aforementioned one or more SSIDs.

In A3, an operation for selecting the SSID "X1" from among the one or more SSIDs is performed on the portable terminal PT1 by the user (YES in S108 of FIG. 4). In this case, in T32, the portable terminal PT1 displays the password input screen (S110). In A4, an operation for inputting the password "PS" of the printer PR is performed on the portable terminal PT1 by the user. In this case, in T40, the portable terminal PT1 sends the Wi-Fi connection request signal including the SSID "X1" selected in A3 to the printer PR. Furthermore, in a case where either the SSID "X1" is not selected in A3, or a cancel is performed without inputting a password in A4, the Wi-Fi connection request signal is not sent from the portable terminal PT1, and as a result, the printer PR determines NO in S18 of FIG. 2.

When the Wi-Fi connection request signal is sent to the printer PR from the portable terminal PT1, in T42, a Wi-Fi connection is established between the printer PR and the portable terminal PT1 (S20 of FIG. 2, and S114 of FIG. 4).

Herein, in the process of T42, the printer PR receives the Wi-Fi setting information including the SSID "X1" and the password "PS" from the portable terminal PT1, and performs an authentication of the Wi-Fi setting information, and because the authentication is successful in this case, establishes the Wi-Fi connection with the portable terminal PT1. Consequently, a Wi-Fi network in which the printer PR operates as a parent station and the portable terminal PT1 operates as a child station is formed.

After establishing the Wi-Fi connection with the portable terminal PT1, in T44, the printer PR uses the Wi-Fi connection so as to send the BT device name "NP" of the printer PR to the portable terminal PT1 (S24 of FIG. 2). Then, the printer PR changes the sending flag 38 to "ON" (YES in S26, and S28), and as a result, in T46, shifts the BT I/F 22 from the OFF state to the ON state (YES in S70, YES in S72, and S74 of FIG. 3).

The portable terminal PT1, in a case where the BT device name "NP" is received from the printer PR, in T50, stores the BT device name "NP" (S116 of FIG. 4). Next, in T60, the portable terminal PT1 uses the Wi-Fi connection so as to send print data to the printer PR (S118).

The printer PR, in a case where the print data is received from the portable terminal PT1, in T62, performs a print process according to the print data (S30 of FIG. 2). Furthermore, a configuration in which the printer PR receives the print data from the portable terminal PT1 using a BT communication is conceivable. However, there is a possibility that the print data may be large in size, and, in addition, the communication speed of a BT communication may be slower than the communication speed of a Wi-Fi communication. Therefore, in a case that employs the configuration in which a BT communication is used to communicate the print data, the print data communication may take a long time. By contrast, in the present embodiment, a Wi-Fi communication is used to communicate the print data, thereby making it possible to communicate the print data quickly.

The portable terminal PT1, after sending the print data to the printer PR, in T70, sends a disconnection signal for disconnecting the Wi-Fi connection to the printer PR (S120 of FIG. 4). Consequently, the W-Fi connection between the printer PR and the portable terminal PT1 is disconnected.

The printer PR, after receiving the disconnection signal from the portable terminal PT1 (S32 of FIG. 2), in T72, generates an SSID "X2" that differs from the SSID "X1" (S34).

Case B1; FIG. 6

A case B1 of FIG. 6 is a continuation of the case A of FIG. 5, the Wi-Fi I/F 20 of the printer PR is in the ON state (refer to T4 of FIG. 5), and the BT I/F 22 is in the ON state (refer to T46). Also, the BT device name "NP" of the printer PR, which is the connection-established printer, is stored in the BT device name storing area 80 of the portable terminal PT1 (refer to T50).

In T100, the printer PR repeats the broadcast transmission of the Advertise signal (S80 of FIG. 3). The Advertise signal includes the BT device name "NP" of the printer PR as information indicating the source of the signal, and, in addition, includes the SSID "X2" and the password "PS".

As described above, in a case where the sending flag 38 indicates "ON", that is, in a case where the BT device name "NP" has been sent to the exterior at least one time, the BT I/F 22 is in the ON state (refer to T46 of FIG. 5), and the printer PR repeats sending of the Advertise signal (T100).

On the other hand, in a case where the sending flag 38 indicates "OFF", that is, in a case where the BT device name "NP" has never been sent to the exterior, the BT I/F 22 is maintained in the OFF state, and the printer PR does not send the Advertise signal (YES in S70, and NO in S72 of FIG. 3). The printer PR is able to realize power saving because of this.

In A10, an operation for activating the printer application 78 is performed on the portable terminal PT1 by the user (trigger of process of FIG. 4). In this case, the portable terminal PT1 receives the Advertise signal from the printer PR (YES in S140), and in T102, determines that the BT device name "NP" included in the Advertise signal is stored in the BT device name storing area 80 (YES in S142). Then, in T120, the portable terminal PT1 sends the Wi-Fi connection request signal including the SSID "X2" in the Advertise signal to the printer PR (S148). Thus, the portable terminal PT1 sends the Wi-Fi connection request signal to the printer PR without displaying a screen for selecting an SSID (refer to T30 of FIG. 5) and a screen for inputting a password (refer to T32). Therefore, the user can easily establish Wi-Fi connection for a second time and onward between the printer PR and the portable terminal PT1.

When the Wi-Fi connection request signal is sent from the portable terminal PT1 to the printer PR, in T122, a Wi-Fi connection is established between the printer PR and the portable terminal PT1 (S50 of FIG. 2, and S150 of FIG. 4). T130, T132, T140, and T142, which are performed after T122, are the same as T60, T62, T70, and T72, respectively, of FIG. 5 (S52 to S56 of FIG. 2, and S152 and S154 of FIG. 4). Furthermore, in T142, an SSID "X3", which differs from the SSIDs "X1" and "X2", is generated.

Case B2

A case B2 is also a continuation of the case A. The BT device name "NP" of the printer PR is not stored in a BT device name storing area (omitted from the drawing) of the portable terminal PT2.

In T150, the printer PR repeats sending of the Advertise signal the same way as in T100 (S80 of FIG. 3). In A20, an operation for activating a printer application is performed on the portable terminal PT2 by the user (trigger of process of FIG. 4). In this case, the portable terminal PT2 receives the Advertise signal from the printer PR (YES in S140 of FIG. 4), but in T152, determines that the BT device name "NP" in the Advertise signal is not stored in the BT device name storing area (NO in S142). As a result, the portable terminal PT2 does not send the Wi-Fi connection request signal to the printer PR. Hypothetically, the same operations A1, A2 and so forth as the case A of FIG. 5 need to be performed on the printer PR and the portable terminal PT2 in order to cause a Wi-Fi connection to be established between the printer PR and the portable terminal PT2.

Effects of First Embodiment

The printer PR performs the BT communication and repeats the broadcast transmission of the Advertise signal (T100 of FIG. 6). Consequently, the Advertise signal is received by the portable terminal PT1, the Wi-Fi connection request signal is sent from the portable terminal PT1 to the printer PR (T120), and the Wi-Fi connection is established between the printer PR and the portable terminal PT1 (T122). Thus, the printer PR and the portable terminal PT1 can appropriately form the Wi-Fi network after performing the BT communication, and as a result, can use the Wi-Fi network to appropriately perform the print data communication.

Also, in the present embodiment, the BT communication is performed between the printer PR and the portable terminal PT1, but there is no need to establish the logical link of the BT scheme (i.e. the BT-scheme wireless connection) between the printer PR and the portable terminal PT1. Therefore, since there is no need to communicate the signal for establishing the logical link of the BT scheme between the printer PR and the portable terminal PT1, the processing load between the printer PR and the portable terminal PT1 may be lessened. Also, since the Wi-Fi setting information including the SSID and the password of the printer PR is included in the Advertise signal, there is no need to perform the BT communication of the Wi-Fi setting information subsequent to the BT communication of the Advertise signal between the printer PR and the portable terminal PT1. In this respect as well, the processing load between the printer PR and the portable terminal PT1 may be lessened.

Also, in the present embodiment, in a case where the portable terminal PT1 is storing the BT device name "NP" of the printer PR, that is, in a case where the portable terminal PT1 has established the Wi-Fi connection with the printer PR in the past, the Wi-Fi connection request signal is sent from the portable terminal PT1 to the printer PR that is the connection-established printer (refer to the case B1 of FIG. 6). Consequently, the Wi-Fi connection is established between the printer PR and the portable terminal PT1 even though the Wi-Fi connection operation has not been performed on the printer PR and the portable terminal PT1. The user of the portable terminal PT1 can easily establish the Wi-Fi connection with the connection-established printer.

On the other hand, in a case where the portable terminal PT2 is not storing the BT device name "NP" of the printer PR, that is, in a case where the portable terminal PT2 has not established the Wi-Fi connection with the printer PR in the past, the Wi-Fi connection request signal is not sent from the portable terminal PT2 to the printer PR (refer to the case B2 of FIG. 6). Then, in order to establish the Wi-Fi connection between the printer PR and the portable terminal PT2, the Wi-Fi connection operation needs be performed on the printer PR and the portable terminal PT2 (refer to A1 and A2 of FIG. 5), and, in addition, the operation for selecting the SSID and the operation for inputting the password need to be performed on the portable terminal PT2 (refer to A3 and A4 of FIG. 5). This, for example, makes it possible to prevent the portable terminal PT2, which is not permitted by administrator of the printer PR to use the printer PR, from establishing the Wi-Fi connection with the printer PR. The security of the printer PR can be enhanced because of this.

Also, the portable terminals PT1 and PT2 comprise the BT device name storing area 80, determine whether or not the BT device name "NP" of the printer PR is stored in the BT device name storing area 80 (S142 of FIG. 4), and change processing subsequent thereto in accordance with the determination result. Therefore, the printer PR does not need to be provided with a BT device name storing area, and, in addition, does not need to perform the determination process. The processing load of the printer PR may be reduced because of this.

Corresponding Relationships

The printer PR and the portable terminals PT1 and PT2, respectively, are examples of the "first communication apparatus" and the "second communication apparatus". The BT device name "NP" is an example of the "first apparatus identification information". When viewed from the printer PR, the portable terminal PT1 is an example of the "third communication apparatus". When viewed from the portable terminal PT1, the printer PR and the BT device name "NP", respectively, are examples of the "third communication apparatus" and "third apparatus identification information". The Wi-Fi scheme and the Wi-Fi I/Fs 20 and 60, respectively, are examples of the "first communication scheme" and the "first interface". The BT scheme and the BT I/Fs 22 and 62, respectively, are examples of the "second communication scheme" and the "second interface". The Advertise signal and the Wi-Fi connection request signal, respectively, are examples of the "trigger signal" and the "wireless connection request". The OFF state and the ON state of the BT I/F 22, respectively, are examples of the "first state" and the "second state". Also, the Wi-Fi connection established in T122 of FIG. 6 and the Wi-Fi connection established in T42 of FIG. 5, respectively, are examples of the "first wireless connection" and the "second wireless connection". The SSID "X2" and the password "PS" in the Advertise signal of T100 of FIG. 6 are examples of the "network-related information".

Second Embodiment

A second embodiment will be explained by focusing mainly on points of difference from the first embodiment. In the first embodiment, the Advertise signal of which the broadcast transmission is performed from the printer PR includes the BT device name "NP" of the printer PR, the current SSID, and the password (S80 of FIG. 3). In the present embodiment, the Advertise signal includes the BT device name "NP", but does not include the current SSID and the password. This point differs greatly from the first embodiment.

Wi-Fi I/F Related Process of Printer PR; FIG. 7

In the present embodiment, a Wi-Fi I/F related process of FIG. 7 is performed instead of that of FIG. 2. S2 is the same as S2 of FIG. 2. In FIG. 2, when S2 ends, S4 is performed, but in FIG. 7, when S2 ends, the processing advances to S10.

S10 is the same as S10 of FIG. 2. In the case of YES in S10, the CPU 32 performs S11. S11 is the same as S4 of FIG. 2. S12 to S32, which are performed subsequent thereto, are the same as S12 to S32 of FIG. 2. In S34A, the CPU 32 shifts the operating state of the printer PR from the G/O state to the device state (i.e. stops the G/O state). This makes it possible to reduce the power consumption of the printer PR. In S34A, the CPU 32 also shifts the Wi-Fi I/F 20 from the ON state to the OFF state. This makes it possible to reduce the power consumption of the printer PR. In S34A, the CPU 32 also generates a new SSID, and causes the new SSID to be stored in the memory 34 in place of an old SSID in the memory 34. When S34A ends, the CPU 32 returns to S10.

Also, in S40A, the CPU 32 monitors for obtaining of a predetermined notice (refer to S90 of FIG. 3) from the BT I/F related process without the Wi-Fi connection operation being performed (NO in S10). Hereinbelow, a portable terminal for which a Wi-Fi connection has been established with the printer PR will be called "connection-established terminal". The predetermined notice is a notice that is supplied to the Wi-Fi I/F related process from the BT I/F related process in a case where a Scan Request signal is received from the connection-established terminal in accordance with the BT communication. The CPU 32, in a case where the predetermined notice is obtained, determines YES in S40A, and proceeds to S42.

S42 is the same as S11. In S44, the CPU 32 determines whether the Wi-Fi connection request signal including the current SSID is received via the Wi-Fi I/F 20 from the portable terminal that is the connection-established terminal. The CPU 32, in a case where the Wi-Fi connection request signal including the current SSID is received, determines YES in S44, and proceeds to S50. On the other hand, in a case where the Wi-Fi connection request signal including the current SSID is not received during a predetermined time period after S42 ends, the CPU 32 determines NO in S44, skips S50 to S54, and proceeds to S56A. S50 to S54 are the same as S50 to S54 of FIG. 2. S56A is the same as S34A. When S56A ends, the CPU 32 returns to S10.

BT I/F Related Process of Printer PR; FIG. 3

Next, contents of the BT I/F related process of the present embodiment will be explained by referring to FIG. 3. S70 to S74 are the same as the first embodiment. In S80, the CPU 32 of the printer PR performs a broadcast transmission of the Advertise signal that includes the BT device name "NP" as information indicating its source. However, the Advertise signal does not include the current SSID and the password. When S80 ends, the CPU 32 proceeds to S82.

In S82, the CPU 32 determines whether or not the Scan Request signal (hereinafter written as "Scan_Req signal") has been received from the portable terminal via the BT I/F 22. The Scan_Req signal is a signal that is sent from the portable terminal in a case where the portable terminal that received the Advertise signal is the connection-established terminal. The Scan_Req signal is a unicast signal, and includes the BT device name "NP" of the printer PR as information indicating its destination, and also includes the BT device name of the portable terminal (e.g. the BT device name "N1" of the portable terminal PT1) as information indicating its source. The Scan_Req signal is a signal for requesting the printer PR for Wi-Fi setting information including the SSID and the password. In particular, the CPU 32 can receive the Scan_Req signal even without establishing a logical link. That is, the Scan_Req signal is received from the exterior by a communication of a lower layer than a highest layer for establishing the logical link being performed without performing a communication of the highest layer. The CPU 32, in a case where the Scan_Req signal is received, determines YES in S82, and proceeds to S90. On the other hand, in a case where the Scan_Req signal has not been received during a predetermined time period after S80 ends, the CPU 32 determines NO in S82, skips S90 and S92, and returns to S70.

In S90, the CPU 32 supplies the predetermined notice to the Wi-Fi I/F related process (refer to FIG. 7). Consequently, the Wi-Fi I/F 20 is shifted to the ON state, and the operating state of the printer PR is shifted to the G/O state (YES in S40A, and S42 of FIG. 7).

In S92, the CPU 32 sends a Scan Response signal (hereinafter written as "Scan_Res signal") via the BT I/F 22 to the portable terminal that is the source of the Scan_Req signal. The Scan_Res signal is a response signal to the Scan_Req signal, and includes the current SSID and the password (i.e. a fixed character string preset in the printer PR). Also, the Scan_Res signal is a unicast signal, and includes the BT device name of the portable terminal (i.e. the BT device name of the source in the Scan_Req signal) as information indicating its destination, and also includes the BT device name "NP" of the printer PR as information indicating its source. The CPU 32 sends the Scan_Res signal without establishing a logical link. That is, the Scan_Res signal is sent to the exterior by a communication of a lower layer than a highest layer for establishing the logical link being performed without performing a communication of the highest layer. When S92 ends, CPU 32 returns to S70.

Process of Portable Terminal; FIG. 4

Next, contents of a process of the portable terminal PT1 of the present embodiment will be explained by referring to FIG. 4. S100 to S120, S140, and S142 are the same as in the first embodiment. In the case of YES in S142, in S144, the CPU 72 of the portable terminal PT1 performs a unicast transmission of the Scan_Req signal to the printer PR which is the connection-established printer. The Scan_Req signal may be received by the printer PR (refer to YES in S82 of FIG. 3).

Next, in S146, the CPU 72 determines whether or not the Scan_Res signal (refer to S92 of FIG. 3) has been received via the BT I/F 62 from the printer PR which is the connection-established printer. The CPU 72, in a case where the Scan_Res signal has been received, determines YES in S146, and proceeds to S148. On the other hand, in a case where the Scan_Res signal has not been received during a predetermined time period after S144 ends, the CPU 72 determines NO in S146, skips S148 to S154, and returns to S100. S148 to S154 are the same as in the first embodiment.

Case C; FIG. 8

Next, a specific case of the present embodiment will be explained by referring to FIGS. 8 and 9. An initial state of a case C of FIG. 8 is the same as that of the case A of FIG. 5. Contents of the case C will be explained by mainly focusing on points that differ from the case A of FIG. 5.

In a case where the power supply is turned ON (A0), the printer PR generates an SSID in T202, but maintains the Wi-Fi I/F 20 in the OFF state, and, in addition, does not shift to the G/O state (i.e. does not perform T4 of FIG. 5). Therefore, it is possible to reduce the power consumption of the printer PR.

In a case where the Wi-Fi connection operation is performed on the printer PR (A1), in T204, the printer PR shifts the Wi-Fi I/F 20 to the ON state, and shifts to the G/O state (YES in S10, and S11 of FIG. 7). T210 is the same as T10 of FIG. 5. Operations A1 to A4 performed on the portable terminal PT1 are the same as in FIG. 5. Also, T220 to T270 are the same as T20 to T70 of FIG. 5. In T272, the printer PR shifts to the device state, shifts the Wi-Fi I/F 20 to the OFF state, and generates the SSID "X2" (S34A of FIG. 7). Because of performing T272, it is possible to reduce the power consumption of the printer PR.

Case D1; FIG. 9

A case D1 of FIG. 9 is a continuation of the case C of FIG. 8, the Wi-Fi I/F 20 is in the OFF state (refer to T272 of FIG. 8), and the BT I/F 22 is in the ON state (refer to T246). Also, the BT device name "NP" of the printer PR which is the connection-established printer is stored in the BT device name storing area 80 of the portable terminal PT1 (refer to T250). Contents of the case D1 will be explained by focusing mainly on points of difference from the case B of FIG. 6.

The Advertise signal of T300 includes the BT device name "NP" of the printer PR as information indicating its source, but does not include the SSID "X2" and the password "PS". An operation A10 performed on the portable terminal PT1 is the same as that of FIG. 6. T302 is the same as T102 of FIG. 6.

In T310, the portable terminal PT1 sends the Scan_Req signal to the printer PR (S144 of FIG. 4). The Scan_Req signal includes the BT device name "NP" as information indicating its destination, and also includes the BT device name "N1" as information indicating its source.

In a case where the Scan_Req signal is received from the portable terminal PT1, in T312, the printer PR shifts the Wi-Fi I/F 20 to the ON state, and shifts to the G/O state (YES in S82, and S90 of FIG. 3, and YES in S40A, and S42 of FIG. 7). Then, in T314, the printer PR sends the Scan_Res signal to the portable terminal PT1. The Scan_Res signal includes the BT device name "N1" as information indicating its destination, and also includes the BT device name "NP" as information indicating its source. The Scan_Res signal also includes the SSID "X2" and the password "PS". T320 to T340 are the same as T120 to T140 of FIG. 6. In T342, the printer PR shifts to the device state (i.e. stops the G/O state), shifts the Wi-Fi I/F 20 to the OFF state, and generates the SSID "X3" (S56A of FIG. 7). By performing T342, it is possible to reduce the power consumption of the printer PR.

Case D2

A case D2 is also a continuation of the case C. The Advertise signal of T350 does not include the SSID "X2" and the password "PS". A20 is the same as that of the case B2 of FIG. 6, and T352 is the same as T152 of FIG. 6. The portable terminal PT2 does not send the Scan_Req signal to the printer PR (NO in S142 of FIG. 4), and as a result, does not send the Wi-Fi connection request signal to the printer PR.

Effects of Second Embodiment

In the present embodiment as well, it is possible to appropriately form the Wi-Fi network between the printer PR and the portable terminal PT1 after having performed the BT communication (refer to the case D1 of FIG. 9). In addition, the same effects as the first embodiment are also achieved. In the present embodiment, the Wi-Fi setting information including the SSID and the password of the printer PR is not included in the Advertise signal. Therefore, for example, it is possible to prevent the Wi-Fi setting information from being sent to the portable terminal PT2, which is not permitted by the printer PR administrator to use the printer PR. Therefore, the security of the printer PR can be enhanced. Furthermore, in the present embodiment, the Scan_Req signal and the Scan_Res signal, respectively, are examples of the "predetermined request signal" and the "response signal". Also, the SSID and the password included in the Scan_Res signal are examples of the "network-related information".

Third Embodiment

A third embodiment will be explained by focusing mainly on points of difference from the embodiments described above. A portable terminal (e.g. PT1) comprises the BT device name storing area (e.g. 80) in the respective embodiments described above, but in the present embodiment, does not comprise a BT device name storing area. The memory 34 of the printer PR comprises a BT device name storing area 40 for storing the BT device name of the connection-established terminal (refer to FIG. 1). Also, the memory 34 does not store the sending flag 38.

Wi-Fi I/F Related Process of Printer PR; FIG. 7

Next, contents of the Wi-Fi I/F related process of the present embodiment will be explained by referring to FIG. 7. S2 to S20 are the same as in the second embodiment. In S24, the CPU 32 of the printer PR uses the Wi-Fi connection so as to receive the BT device name of the portable terminal from the portable terminal via the Wi-Fi I/F 20. Then, the CPU 32 causes the received BT device name to be stored in the BT device name storing area 40. Consequently, the BT device name of the connection-established terminal is stored in the BT device name storing area 40. When S24 ends, the CPU 32 proceeds to S30 without performed S26 and S28. S30 to S34A, and S40A to S56A are the same as in the second embodiment.

BT I/F Related Process of Printer PR; FIG. 3

Next, contents of the BT I/F related process of the present embodiment will be explained by referring to FIG. 3. S70 is the same as that of the first and second embodiments. In S72, the CPU 32 determines whether or not one or more BT device names are stored in the BT device name storing area 40 in the memory 34. In a case where the one or more BT device names are stored, the CPU 32 determines YES in S72, and proceeds to S74, whereas in a case where no BT device names are stored, determines NO in S72, skips S74, and returns to S70.

S80 and S82 are the same as in the second embodiment. In a case where YES is determined in S82, in S84, the CPU 32 determines whether or not the BT device name of its source that is included in the Scan_Req signal is stored in the BT device name storing area 40 in the memory 34. In a case where the BT device name of the source is stored in the BT device name storing area 40, that is, in a case where the portable terminal which is the source of the Scan_Req signal is the connection-established terminal, the CPU 32 determines YES in S84, and proceeds to S90. On the other hand, in a case where the BT device name of the source is not stored in the BT device name storing area 40, that is, in a case where a Wi-Fi connection has not been established in the past with the portable terminal which is the source of the Scan_Req signal, the CPU 32 determines NO in S84, skips S90 and S92, and returns to S70. S90 and S92 are the same as in the second embodiment.

Process of Portable Terminal; FIG. 4

Next, contents of a process of the portable terminal PT1 of the present embodiment will be explained by referring to FIG. 4. S100 to S114 are the same as in the first and second embodiments. In S116, the CPU 72 of the portable terminal PT1 uses the Wi-Fi connection established in S114 so as to send the BT device name "N1" of the portable terminal PT1 to the printer PR via the Wi-Fi I/F 60 (S24 of FIG. 7). S118, S120 and S140 are the same as in the first and second embodiments. In a case of YES in S140, the CPU 72 of the portable terminal PT1 proceeds to S144 without performing S142. That is, in S144, the CPU 72 sends the Scan_Req signal to the printer PR regardless of whether or not the printer PR which is the source of the Advertise signal is the connection-established printer. S146 to S154 are the same as in the second embodiment.

Case E; FIG. 10

Next, a specific case of the present embodiment will be explained by referring to FIGS. 10 and 11. An initial state of a case E of FIG. 10 is the same as that of the case A of FIG. 5 (i.e. the initial state of the case C of FIG. 8). Contents of the case E will be explained by focusing mainly on points of difference from the case C of FIG. 8.

A0 to A4 are the same as in FIG. 8, and T402 to T442 are the same as T202 to T242 of FIG. 8. In T444, the portable terminal PT1 uses a Wi-Fi connection established in T442 so as to send the BT device name "N1" of the portable terminal PT1 to the printer PR (S116 of FIG. 4).

The printer PR, in a case where the BT device name "N1" is received from the portable terminal PT1, in T445, stores the BT device name "N1" in the BT device name storing area 40 (S24 of FIG. 7). As a result, in T446, the printer PR shifts the BT I/F 22 from the OFF state to the ON state (YES in S70, YES in S72, and S74 of FIG. 3). T460 to T472 are the same as T260 to T272 of FIG. 8.

Case F1; FIG. 11

A case F1 of FIG. 11 is a continuation of the case E of FIG. 10, the Wi-Fi I/F 20 is in the OFF state (refer to T472 of FIG. 10), and the BT I/F 22 is in the ON state (refer to T446). Also, the BT device name "N1" of the portable terminal PT1 which is the connection-established terminal is stored in the BT device name storing area 40 of the printer PR (refer to T445). Contents of the case F1 will be explained by focusing mainly on points of difference from the case D1 of FIG. 9.

A10 is the same as in the case D1 of FIG. 9, and T500 and T510 are the same as T300 and T310 of FIG. 9. The printer PR, in a case where the Scan_Req signal is received from the portable terminal PT1, in T511, determines that the BT device name "N1"of the source of the Scan_Req signal is stored in the BT device name storing area 40 (YES in S84 of FIG. 3). Therefore, in T512, the printer PR shifts the Wi-Fi I/F 20 to the ON state, and shifts to the G/O state (S90 of FIG. 3, Yes in S40A and S42 of FIG. 7). T514 to T542 are the same as T314 to T342 of FIG. 9.

Case F2

A case F2 is also a continuation of the case E. The BT device name "N2" of the portable terminal PT2 is not stored in the BT device name storing area 40 of the printer PR. T550 is the same as T350 of FIG. 9. In a case where an operation of A20 is performed and the Advertise signal is received from the printer PR, in T560, the portable terminal PT2 sends the Scan_Req signal to the printer PR (YES in S140, and S144 of FIG. 4). The Scan_Req signal includes the BT device name "NP" as information indicating its destination, and also include the BT device name "N2" as information indicating its source.

The printer PR, in a case where the Scan_Req signal is received from the portable terminal PT2, in T561, determines that the BT device name "N2" of the source of the Scan_Req signal included in the Scan_Req signal is not stored in the BT device name storing area 40 (NO in S84 of FIG. 3). Therefore, the printer PR does not shift the Wi-Fi I/F 20 to the ON state, and does not shift to the G/O state. This makes it possible to reduce the power consumption of the printer PR. The printer PR also does not send the Scan_Res signal to the portable terminal PT2. As a result, the portable terminal PT2 does not send the printer PR the Wi-Fi connection request signal (NO in S146 of FIG. 4).

Effects of Third Embodiment

In the present embodiment as well, it is possible to appropriately form the Wi-Fi network between the printer PR and the portable terminal PT1 after having performed the BT communication (refer to the case F1 of FIG. 11). In addition, the same effects as the first and second embodiments are also achieved. In the present embodiment, the printer PR does not automatically send the Scan_Res signal including the Wi-Fi setting information to the portable terminal in a case where the Scan_Req signal is received from the portable terminal, but sends the Scan_Res signal including the Wi-Fi setting information to the portable terminal in response to the portable terminal being the connection-established terminal (YES in S84 of FIG. 3). Therefore, for example, it is possible to prevent the Wi-Fi setting information from being sent to the portable terminal PT2 which is not permitted by the printer PR administrator to use the printer PR. The security of the printer PR can be enhanced because of this.

Also, in the present embodiment, the printer PR comprises the BT device name storing area 40, determines whether or not the BT device name of the portable terminal is stored in the BT device name storing area 40 (S84 of FIG. 3), and changes the processing subsequent thereto in accordance with the determination result. Therefore, the portable terminals PT1 and PT2 need not comprise a BT device name storing area, and, in addition, need not perform the determination process. Therefore, it is possible to reduce the processing loads of the portable terminals PT1 and PT2. Furthermore, in the present embodiment, the BT device names "N1" and "N2" of the portable terminals PT1 and PT2 are examples of the "second apparatus identification information". Also, when viewed from the printer PR, the portable terminal PT1 and the BT device name "N1", respectively, are examples of the "third communication apparatus" and "third apparatus identification information".

Variation 1

In S80 of FIG. 3 of the embodiments, the printer PR may send the Advertise signal that does not include the BT device name "NP" of the printer PR to the exterior. Then, the portable terminal PT1, in a case where the Advertise signal is received from the printer PR in S140 of FIG. 4 (YES in S140), may perform S148 without performing S142 to S146. That is, the "trigger signal" may not include the "first apparatus identification information".

Variation 2

In the first and second embodiments, the printer PR may not perform S24 of FIGS. 2 and 7. In this case, for example, the portable terminal PT1 may perform the BT communication with the printer PR, and may receive the BT device name "NP" from the printer PR. Also, for example, the user of the portable terminal PT1 may perform an operation for inputting the BT device name "NP" of the printer PR to the portable terminal PT1, and may cause the BT device name "NP" to be stored in the BT device name storing area 80.

Variation 3

In the third embodiment, the portable terminal PT1 may not perform S116 of FIG. 4. In this case, for example, the printer PR may perform the BT communication with the portable terminal PT1, and may receive the BT device name "N1" from the portable terminal PT1. Also, for example, the user of the portable terminal PT1 may perform an operation for inputting the BT device name "N1" of the portable terminal PT1 to the printer PR, and may cause the BT device name "N1" to be stored in the BT device name storing area 40.

Variation 4

In the first embodiment, the BT I/F 22 of the printer PR may comprise a CPU and a memory. The memory of the BT I/F 22 may store a program and the BT device name "NP" beforehand. While the BT I/F 22 is in the ON state, the CPU of the BT I/F 22 may repeat the sending of the BT device name "NP" to the exterior in accordance with the program in the memory of the BT I/F 22 without receiving an instruction from the CPU 32 in the controller 30. In this case, the BT I/F 22 may have a simple configuration via which two-way communication is not possible. That is, the BT I/F 22 may be incapable of performing the communication of the Scan_Req signal and the Scan_Res signal. Generally, the "first communication apparatus" may comprise two or more processors (e.g. the CPU 32 in the controller 30 of the printer PR and the CPU in the BT I/F 22), and two or more memories (e.g. the memory 34 in the controller 30 and the memory in the BT I/F 22), and the respective processors may perform processes in accordance with the respective programs stored in the respective memories.

Variation 5

In S80 of FIG. 3 of the first embodiment, the printer PR may send the Advertise signal that does not include a password. Also, in S92 of FIG. 3 of the second and third embodiments, the printer PR may send a Scan_Res signal that does not include a password. In this case, a password input screen is displayed on the portable terminal that has received either the Advertise signal or the Scan_Res signal, and a password is inputted to the portable terminal by the user. In the present variation, only the SSID is an example of the "network-related information".

Variation 6

In the embodiments, the BT I/F 22 may be maintained in the ON state while the power supply to the printer PR is ON. Then, the printer PR may repeat the sending of the Advertise signal while the power supply to the printer PR is ON.

Variation 7

In the embodiments, the password of the printer PR is fixed information, but the SSID of the printer PR is changed each time the Wi-Fi connection between the printer PR and the portable terminal is disconnected. Instead of this, both the SSID and the password of the printer PR may be fixed information. Then, in S80 of FIG. 3 of the first embodiment, the printer PR may send the Advertise signal that does not include either an SSID or a password. Also, in S92 of FIG. 3 of the second and third embodiments, the printer PR may send the Scan_Res signal that does not include either an SSID or a password. In this case, the portable terminal PT1 stores both the SSID and the password of the printer PR in a case where the Wi-Fi connection with the printer PR is established in S114 of FIG. 4. Then, in S150 of FIG. 4, the portable terminal PT1 uses the stored SSID and password to establish a Wi-Fi connection with the printer PR. That is, the "first communication apparatus" may not send the network-related information to the exterior.

Variation 8

In S92 of FIG. 3 of the second and third embodiments, the printer PR may establish a BT-scheme logical link (i.e. BT connection) with the portable terminal, and use the BT connection to send the SSID and the password to the portable terminal. That is, the "network-related information" may be sent to the exterior without using the wireless connection according to the second communication scheme as in the second and third embodiments, and may be sent to the exterior using the wireless connection according to the second communication scheme as in the present variation.

Variation 9

The printer PR may not support the WFD, and instead may support so-called SoftAP. In this case, the printer PR activates the SoftAP in S4 of FIG. 2 and in either S11 or S42 of FIG. 7, and stops the SoftAP in S34A and S56A of FIG. 7.

Variation 10

The "first (or second or third) apparatus identification information" may not be the BT device name, but alternatively may be other identification information (e.g. a MAC address, an IP address, or the like).

Variation 11

In the first embodiment, while the power supply to the printer PR is ON, the Wi-Fi I/F 20 is maintained in the ON state, and the operating state of the printer PR is maintained in the G/O state (S4 of FIG. 2). Instead of this, when the power supply to the printer PR is turned ON, the printer PR may determine whether or not the sending flag 38 indicates "ON", may perform the process of S4 in a case where the sending flag 38 indicates "ON", and may not perform the process of S4 in a case where the sending flag 38 indicates "OFF". In the present variation, the Wi-Fi I/F 20 may be set to the OFF state, and the operating state of the printer PR may be set to the device state while the power supply to the printer PR is ON, thereby making it possible to reduce the power consumption of the printer PR.

Variation 12

In the embodiments, the "first state" of the "second interface" is the OFF state in which power is not supplied to the BT I/F 22. Instead of this, the "first state" may be a power-saving state in which a small amount of power is supplied to the BT I/F 22. In this case, the "first state" may be a state in which it is possible to perform a wireless communication via the BT I/F 22, and may be a state in which it is not possible to perform a wireless communication via the BT I/F 22. However, in the case of the former, for example, the "first state" may be a state in which the communication speed is slower than in the "second state". Then, in S74 of FIG. 3, the state of the BT I/F 22 may be shifted from the power-saving state to the ON state in which the power consumption is higher than in the power-saving state. Similarly, the Wi-Fi I/F 20 may also be set to the power-saving state, in which a small amount of power is supplied, instead of the OFF state.

Variation 13

The "first interface" may not be the I/F for performing the Wi-Fi communication, but alternatively may be an I/F for performing the wireless communication according to another communication scheme that is capable of forming a wireless LAN. Also, the "second interface" may not be the I/F for performing the BT communication, but alternatively, for example, may be an I/F for performing the wireless communication according to another communication scheme capable of performing a near field wireless communication (e.g. TransferJet (registered trademark) scheme).

Variation 14

The "first communication apparatus" may not be the printer PR, but alternatively, for example, may be a scanner. In this case, for example, instead of receiving print data from the portable terminal PT1 in S30 of FIG. 2 and FIG. 7 or S52, the scanner may send the portable terminal PT1 scan data generated by performing a scan of a document. Also, the "first communication apparatus" may be an apparatus that differs from a printer and a scanner (e.g. a copy machine, a facsimile machine, a telephone set, a PC, a server, a portable terminal, or the like). Also, the "second communication apparatus" may not be the portable terminal, but alternatively may be another apparatus (e.g. a printer, a scanner, a copy machine, a facsimile machine, a telephone set, a desktop PC, a server, or the like).

Variation 15

In the embodiments, the processes of FIG. 2 to FIG. 11 are realized by the CPU 32 of the printer PR and CPU 72 of the mobile terminal RT1 executing the program (i.e. the software). Alternatively, at least one of the processes from among the processes of FIG. 2 to FIG. 11 may be realized by a logic circuit or other such hardware.

What is claimed is:

1. A printer comprising:
   a Wi-Fi interface configured to perform a wireless communication according to a Wi-Fi scheme;
   a Bluetooth interface configured to perform a wireless communication according to a Bluetooth scheme;
   a print performing unit;
   a processor, and
   a memory configured to store computer-readable instructions, when executed by the processor, causing the printer to perform:
   after a Scan Request signal has been communicated between the printer and a terminal device, sending a first connection information to the terminal device via the Bluetooth interface, the first connection information including a first SSID and a first password corresponding to the first SSID, the first connection information being used for establishing a first wireless connection according to the Wi-Fi scheme;
   receiving a first wireless connection request including the first connection information from the terminal device via the Wi-Fi interface;
   in response to receiving the first wireless connection request from the terminal device, establishing the first wireless connection via the Wi-Fi interface with the terminal device;
   receiving first image data from the terminal device by using the established first wireless connection via the Wi-Fi interface;
   causing the print performing unit to print an image according to the received first image data;
   after the first wireless connection has been disconnected, sending a second connection information to the terminal device via the Bluetooth interface, the second connection information including a second SSID different from the first SSID and a second password corresponding to the second SSID, the second connection information being used for establishing a second wireless connection according to the Wi-Fi scheme;
   receiving a second wireless connection request including the second connection information from the terminal device via the Wi-Fi interface;
   in response to receiving the second wireless connection request from the terminal device, establishing the second wireless connection via the Wi-Fi interface with the terminal device;
   receiving second image data from the terminal device by using the established second wireless connection via the Wi-Fi interface; and
   causing the print performing unit to print an image according to the received second image data.

2. The printer as in claim 1, wherein
   the printer further comprises an operation unit and a display unit, and
   the computer-readable instructions, when executed by the processor, further cause the printer to perform:
   in a case where an operation for requesting a connection via the Wi-Fi interface is performed in the operation unit, causing the display unit to display any one of the first SSID and the second SSID.

3. The printer as in claim 1, wherein
   the computer-readable instructions, when executed by the processor, further cause the printer to perform:
   generating the second connection information after the first wireless connection has been disconnected.

4. The printer as in claim 1, wherein
   the computer-readable instructions, when executed by the processor, further cause the printer to perform:
   generating the first connection information at a timing when the printer is turned ON.

5. The printer as in claim 1, wherein
   the computer-readable instructions, when executed by the processor, further cause the printer to perform:
   sending an Advertise signal according to the Bluetooth scheme via the Bluetooth interface, the Advertise signal being a signal of which destination is not specified, the Scan Request signal is communicated between the printer and the terminal device after the Advertise signal has been sent, and
   both of the Advertise signal and the Scan Request signal include printer identification information for identifying the printer.

6. The printer as in claim 1, wherein
   the Scan Request signal includes terminal identification information for identifying the terminal device,
   in a case where information identical to the terminal identification information in the Scan Request signal is stored in the memory, the first connection information is sent to the terminal device via the Bluetooth interface, and
   in a case where information identical to the terminal identification information in the Scan Request signal is not stored in the memory, the first connection information is not sent to the terminal device.

7. A non-transitory computer-readable recording medium storing computer-readable instructions for a printer, wherein the printer comprises:
a Wi-Fi interface configured to perform a wireless communication according to a Wi-Fi scheme;
a Bluetooth interface configured to perform a wireless communication according to a Bluetooth scheme;
a print performing unit;
a processor, wherein
the computer-readable instructions, when executed by the processor, causing the printer to perform:
after a Scan Request signal has been communicated between the printer and a terminal device, sending a first connection information to the terminal device via the Bluetooth interface, the first connection information including a first SSID and a first password corresponding to the first SSID, the first connection information being used for establishing a first wireless connection according to the Wi-Fi scheme;
receiving a first wireless connection request including the first connection information from the terminal device via the Wi-Fi interface;
in response to receiving the first wireless connection request from the terminal device, establishing the first wireless connection via the Wi-Fi interface with the terminal device;
receiving first image data from the terminal device by using the established first wireless connection via the Wi-Fi interface;
causing the print performing unit to print an image according to the received first image data;
after the first wireless connection has been disconnected, sending a second connection information to the terminal device via the Bluetooth interface, the second connection information including a second SSID different from the first SSID and a second password corresponding to the second SSID, the second connection information being used for establishing a second wireless connection according to the Wi-Fi scheme;
receiving a second wireless connection request including the second connection information from the terminal device via the Wi-Fi interface;
in response to receiving the second wireless connection request from the terminal device, establishing the second wireless connection via the Wi-Fi interface with the terminal device;
receiving second image data from the terminal device by using the established second wireless connection via the Wi-Fi interface; and
causing the print performing unit to print an image according to the received second image data.

8. A terminal device comprising:
a Wi-Fi interface configured to perform a wireless communication according to a Wi-Fi scheme;
a Bluetooth interface configured to perform a wireless communication according to a Bluetooth scheme;
a processor, and
a memory configured to store computer-readable instructions therein, the computer-readable instructions, when executed by the processor, causing the terminal device to perform:
after a Scan Request signal has been communicated between a printer and the terminal device, receiving first connection information from the printer via the Bluetooth interface, the first connection information including a first SSID and a first password corresponding to the first SSID, the first connection information being used for establishing a first wireless connection according to the Wi-Fi scheme;
in response to receiving the first connection information from the printer, sending a first wireless connection request including the received first connection information to the printer via the Wi-Fi interface;
in response to sending the first wireless connection request to the printer, establishing a first wireless connection via the Wi-Fi interface with the printer;
sending first image data via the Wi-Fi interface to the printer by using the first wireless connection;
after the first wireless connection with the printer has been disconnected, receiving a second connection information from the printer via the Bluetooth interface, the second connection information including a second SSID different from the first SSID and a second password corresponding to the second SSID, the second connection information being used for establishing a second wireless connection according to the Wi-Fi scheme;
in response to receiving the second connection information from the printer, sending a second wireless connection request including the received second connection information to the printer via the Wi-Fi interface;
in response to sending the second wireless connection request to the printer, establishing a second wireless connection via the Wi-Fi interface with the printer; and
sending second image data via the Wi-Fi interface to the printer by using the second wireless connection.

* * * * *